(12) United States Patent
Davis et al.

(10) Patent No.: US 8,379,908 B2
(45) Date of Patent: Feb. 19, 2013

(54) EMBEDDING AND READING CODES ON OBJECTS

(75) Inventors: Bruce L. Davis, Lake Oswego, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 1884 days.

(21) Appl. No.: 11/383,684

(22) Filed: May 16, 2006

(65) Prior Publication Data

US 2007/0108287 A1    May 17, 2007

Related U.S. Application Data

(63) Continuation of application No. 09/452,021, filed on Nov. 30, 1999, now Pat. No. 7,044,395, which is a continuation-in-part of application No. 09/130,624, filed on Aug. 6, 1998, now Pat. No. 6,324,573, and a continuation-in-part of application No. 09/292,569, (Continued)

(51) Int. Cl.
*G06K 9/00* (2006.01)
(52) U.S. Cl. ...................................................... 382/100
(58) Field of Classification Search .................... 382/100
See application file for complete search history.

(56) References Cited

U.S. PATENT DOCUMENTS

| | | | |
|---|---|---|---|
| 4,547,804 A | 10/1985 | Greenberg |
| 4,920,503 A | 4/1990 | Cook |
| 4,947,028 A | 8/1990 | Gorog |
| 5,113,445 A | 5/1992 | Wang |
| 5,315,098 A | 5/1994 | Tow |
| 5,410,326 A | 4/1995 | Goldstein |
| 5,463,209 A | 10/1995 | Figh et al. |
| 5,483,052 A | 1/1996 | Smith |
| 5,486,686 A | 1/1996 | Zdybel et al. |
| 5,495,581 A | 2/1996 | Tsai |
| 5,577,266 A | 11/1996 | Takahisa et al. |
| 5,594,226 A | 1/1997 | Steger |
| 5,640,193 A | 6/1997 | Wellner |
| 5,665,951 A | 9/1997 | Newman et al. |
| 5,671,282 A | 9/1997 | Wolff et al. |
| 5,703,795 A | 12/1997 | Mankovitz |
| 5,721,827 A | 2/1998 | Logan |

(Continued)

FOREIGN PATENT DOCUMENTS

| | | |
|---|---|---|
| EP | 493 091 | 7/1992 |
| EP | 1132895 | 9/2001 |

(Continued)

OTHER PUBLICATIONS

O'Ruanaidh, "Rotation, Scale and Translation Invariant Digital Image Watermarking," Signal Processing, pp. 2-15, May 1, 1998.

(Continued)

*Primary Examiner* — Vikkram Bali

(57) ABSTRACT

The disclosure relates generally to audio and video signal processing. One claim recites a method comprising: receiving audio or video content, wherein the audio or video content comprises a hidden steganographic code including information, the steganographic code being hidden in the audio or video content through alterations to data representing the audio or video content; detecting the steganographic code to obtain the information, said act of detecting utilizes correlation to obtain the information; providing at least a portion of the information to a data repository to identify machine-executable instructions stored therein; providing data associated with a user to the data repository; receiving machine-executable instructions from the data repository; and executing the machine-executable instructions to control processing of the audio or video content. Of course, other claims and combinations are provided too.

11 Claims, 8 Drawing Sheets

Related U.S. Application Data filed on Apr. 15, 1999, now abandoned, and a continuation-in-part of application No. 09/314,648, filed on May 19, 1999, now Pat. No. 6,681,028, and a continuation-in-part of application No. 09/343,104, filed on Jun. 29, 1999, now abandoned.

(60) Provisional application No. 60/158,015, filed on Oct. 6, 1999, provisional application No. 60/163,332, filed on Nov. 3, 1999, provisional application No. 60/164,619, filed on Nov. 10, 1999.

(56) References Cited

U.S. PATENT DOCUMENTS

| | | |
|---|---|---|
| 5,765,176 A | 6/1998 | Bloomberg |
| 5,804,803 A | 9/1998 | Cragun et al. |
| 5,835,639 A | 11/1998 | Honsinger et al. |
| 5,841,978 A | 11/1998 | Rhoads |
| 5,848,413 A | 12/1998 | Wolff |
| 5,857,038 A | 1/1999 | Owada et al. |
| 5,859,920 A | 1/1999 | Daly et al. |
| 5,862,260 A | 1/1999 | Rhoads |
| 5,869,819 A | 2/1999 | Knowles et al. |
| 5,901,224 A | 5/1999 | Hecht |
| 5,902,353 A | 5/1999 | Reber et al. |
| 5,903,729 A | 5/1999 | Reber et al. |
| 5,905,248 A | 5/1999 | Russell et al. |
| 5,905,251 A | 5/1999 | Knowles |
| 5,913,210 A | 6/1999 | Call |
| 5,918,213 A | 6/1999 | Bernard et al. |
| 5,918,214 A | 6/1999 | Perkowski |
| 5,930,369 A | 7/1999 | Cox et al. |
| 5,930,767 A | 7/1999 | Reber et al. |
| 5,932,863 A | 8/1999 | Rathus et al. |
| 5,933,829 A | 8/1999 | Durst et al. |
| 5,938,726 A | 8/1999 | Reber et al. |
| 5,938,727 A | 8/1999 | Ikeda |
| 5,939,695 A | 8/1999 | Nelson |
| 5,939,699 A | 8/1999 | Perttunen et al. |
| 5,940,595 A | 8/1999 | Reber et al. |
| 5,949,055 A | 9/1999 | Fleet et al. |
| 5,950,173 A | 9/1999 | Perkowski |
| 5,951,055 A | 9/1999 | Mowry, Jr. |
| 5,963,916 A | 10/1999 | Kaplan |
| 5,969,324 A | 10/1999 | Reber et al. |
| 5,971,277 A | 10/1999 | Cragun et al. |
| 5,978,773 A | 11/1999 | Hudetz et al. |
| 5,979,757 A | 11/1999 | Tracy et al. |
| 5,995,105 A | 11/1999 | Reber et al. |
| 6,031,914 A | 2/2000 | Tewfik et al. |
| 6,098,106 A | 8/2000 | Philyaw et al. |
| 6,108,434 A | 8/2000 | Cox et al. |
| 6,119,944 A | 9/2000 | Mulla et al. |
| 6,122,403 A | 9/2000 | Rhoads |
| 6,199,048 B1 | 3/2001 | Hudetz et al. |
| 6,205,249 B1 | 3/2001 | Moskowitz |
| 6,229,924 B1 | 5/2001 | Rhoads et al. |
| 6,249,226 B1 | 6/2001 | Harrison et al. |
| 6,307,949 B1 | 10/2001 | Rhoads |
| 6,311,214 B1 | 10/2001 | Rhoads |
| 6,324,573 B1 | 11/2001 | Rhoads |
| 6,381,341 B1 | 4/2002 | Rhoads |
| 6,385,329 B1 | 5/2002 | Sharma et al. |
| 6,386,453 B1 | 5/2002 | Russell et al. |
| 6,389,055 B1 | 5/2002 | August et al. |
| 6,408,082 B1 | 6/2002 | Rhoads et al. |
| 6,408,331 B1 | 6/2002 | Rhoads |
| 6,411,725 B1 | 6/2002 | Rhoads |
| 6,421,070 B1 | 7/2002 | Ramos et al. |
| 6,424,725 B1 | 7/2002 | Rhoads et al. |
| 6,434,561 B1 | 8/2002 | Durst, Jr. et al. |
| 6,448,979 B1 | 9/2002 | Schena et al. |
| 6,456,727 B1 | 9/2002 | Echizen et al. |
| 6,491,217 B2 | 12/2002 | Catan |
| 6,505,160 B1 | 1/2003 | Levy et al. |
| 6,516,079 B1 | 2/2003 | Rhoads et al. |
| 6,522,770 B1 | 2/2003 | Seder et al. |
| 6,535,617 B1 | 3/2003 | Hannigan et al. |
| 6,542,927 B2 | 4/2003 | Rhoads |
| 6,553,129 B1 | 4/2003 | Rhoads |
| 6,560,349 B1 | 5/2003 | Rhoads |
| 6,567,533 B1 | 5/2003 | Rhoads |
| 6,580,808 B2 | 6/2003 | Rhoads |
| 6,590,996 B1 | 7/2003 | Reed et al. |
| 6,611,607 B1 | 8/2003 | Davis et al. |
| 6,614,914 B1 | 9/2003 | Rhoads et al. |
| 6,636,249 B1 | 10/2003 | Rekimoto |
| 6,647,128 B1 | 11/2003 | Rhoads |
| 6,647,130 B2 | 11/2003 | Rhoads |
| 6,650,761 B1 | 11/2003 | Rodriguez et al. |
| 6,651,053 B1 | 11/2003 | Rothschild |
| 6,675,165 B1 | 1/2004 | Rothschild |
| 6,681,028 B2 | 1/2004 | Rodriguez et al. |
| 6,681,029 B1 | 1/2004 | Rhoads |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,718,046 B2 | 4/2004 | Reed et al. |
| 6,718,047 B2 | 4/2004 | Rhoads |
| 6,721,440 B2 | 4/2004 | Reed et al. |
| 6,760,463 B2 | 7/2004 | Rhoads |
| 6,763,123 B2 | 7/2004 | Reed et al. |
| 6,768,809 B2 | 7/2004 | Rhoads et al. |
| 6,768,980 B1 | 7/2004 | Meyer et al. |
| 6,775,392 B1 | 8/2004 | Rhoads |
| 6,798,894 B2 | 9/2004 | Rhoads |
| 6,813,366 B1 | 11/2004 | Rhoads |
| 6,820,062 B1 | 11/2004 | Gupta |
| 6,829,368 B2 | 12/2004 | Meyer et al. |
| 6,834,308 B1 | 12/2004 | Ikezoye et al. |
| 6,845,170 B2 | 1/2005 | Wendt |
| 6,879,701 B1 | 4/2005 | Rhoads |
| 6,917,724 B2 | 7/2005 | Seder et al. |
| 6,920,232 B2 | 7/2005 | Rhoads |
| 6,941,275 B1 | 9/2005 | Swierczek |
| 6,947,571 B1 | 9/2005 | Rhoads et al. |
| 6,959,098 B1 | 10/2005 | Alattar |
| 6,970,886 B1 | 11/2005 | Conwell et al. |
| 6,973,669 B2 | 12/2005 | Daniels |
| 6,975,745 B2 | 12/2005 | Bradley |
| 6,975,746 B2 | 12/2005 | Davis et al. |
| 6,988,202 B1 | 1/2006 | Rhoads et al. |
| 6,996,252 B2 | 2/2006 | Reed et al. |
| 7,003,731 B1 | 2/2006 | Rhoads et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Davis et al. |
| 7,051,086 B2 | 5/2006 | Rhoads et al. |
| 7,054,465 B2 | 5/2006 | Rhoads |
| 7,058,697 B2 | 6/2006 | Rhoads |
| 7,062,069 B2 | 6/2006 | Rhoads |
| 7,065,559 B1 | 6/2006 | Weiss |
| 7,095,871 B2 | 8/2006 | Jones et al. |
| 7,111,170 B2 | 9/2006 | Rhoads et al. |
| 7,113,614 B2 | 9/2006 | Rhoads |
| 7,116,781 B2 | 10/2006 | Rhoads |
| 7,131,585 B2 | 11/2006 | Gyi et al. |
| 7,139,408 B2 | 11/2006 | Rhoads et al. |
| 7,158,654 B2 | 1/2007 | Rhoads |
| 7,164,780 B2 | 1/2007 | Brundage et al. |
| 7,171,016 B1 | 1/2007 | Rhoads |
| 7,174,031 B2 | 2/2007 | Rhoads et al. |
| 7,177,443 B2 | 2/2007 | Rhoads |
| 7,188,186 B1 | 3/2007 | Meyer et al. |
| 7,213,757 B2 | 5/2007 | Jones et al. |
| 7,224,819 B2 | 5/2007 | Levy et al. |
| 7,228,280 B1 | 6/2007 | Scherf et al. |
| 7,236,610 B1 | 6/2007 | Luo et al. |
| 7,248,717 B2 | 7/2007 | Rhoads |
| 7,261,612 B1 | 8/2007 | Hannigan et al. |
| 7,263,722 B1 | 8/2007 | Luo et al. |

| | | |
|---|---|---|
| 7,299,498 B2 | 11/2007 | Lee et al. |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,564 B2 | 2/2008 | Brundage et al. |
| 7,333,957 B2 | 2/2008 | Levy et al. |
| 7,369,678 B2 | 5/2008 | Rhoads |
| 7,377,421 B2 | 5/2008 | Rhoads |
| 7,391,880 B2 | 6/2008 | Reed et al. |
| 7,406,214 B2 | 7/2008 | Rhoads et al. |
| 7,415,129 B2 | 8/2008 | Rhoads |
| 7,421,586 B2 | 9/2008 | Luo et al. |
| 7,424,131 B2 | 9/2008 | Alattar et al. |
| 7,427,030 B2 | 9/2008 | Jones et al. |
| 7,433,491 B2 | 10/2008 | Rhoads |
| 7,437,430 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,461,136 B2 | 12/2008 | Rhoads |
| 7,466,840 B2 | 12/2008 | Rhoads |
| 7,486,799 B2 | 2/2009 | Rhoads |
| 7,499,566 B2 | 3/2009 | Rhoads |
| 7,502,759 B2 | 3/2009 | Hannigan et al. |
| 7,508,955 B2 | 3/2009 | Carr et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,545,952 B2 | 6/2009 | Brundage et al. |
| 7,562,392 B1 | 7/2009 | Rhoads et al. |
| 7,564,992 B2 | 7/2009 | Rhoads |
| RE40,919 E | 9/2009 | Rhoads |
| 7,587,601 B2 | 9/2009 | Levy et al. |
| 7,587,602 B2 | 9/2009 | Rhoads |
| 7,602,978 B2 | 10/2009 | Levy et al. |
| 7,623,823 B2 | 11/2009 | Zito et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,693,300 B2 | 4/2010 | Reed et al. |
| 7,697,719 B2 | 4/2010 | Rhoads |
| 7,711,143 B2 | 5/2010 | Rhoads |
| 7,711,564 B2 | 5/2010 | Levy et al. |
| 7,715,446 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,905 B2 | 7/2010 | Rhoads et al. |
| 7,762,468 B2 | 7/2010 | Reed et al. |
| 7,787,653 B2 | 8/2010 | Rhoads |
| 7,792,325 B2 | 9/2010 | Rhoads et al. |
| 7,822,225 B2 | 10/2010 | Alattar |
| 7,837,094 B2 | 11/2010 | Rhoads |
| 7,945,781 B1 | 5/2011 | Rhoads |
| 2001/0021916 A1 | 9/2001 | Takai |
| 2001/0034705 A1 | 10/2001 | Rhoads et al. |
| 2001/0036839 A1 | 11/2001 | Tsai |
| 2001/0055407 A1 | 12/2001 | Rhoads |
| 2002/0009208 A1 | 1/2002 | Alattar et al. |
| 2002/0012446 A1 | 1/2002 | Tanaka |
| 2002/0026362 A1 | 2/2002 | Tanaka |
| 2002/0029257 A1 | 3/2002 | Watanabe et al. |
| 2002/0040433 A1 | 4/2002 | Kondo |
| 2002/0080271 A1 | 6/2002 | Eveleens et al. |
| 2002/0083469 A1 | 6/2002 | Jeannin et al. |
| 2002/0092017 A1 | 7/2002 | Klosterman et al. |
| 2002/0131076 A1 | 9/2002 | Davis |
| 2002/0150165 A1 | 10/2002 | Huizer |
| 2002/0162118 A1 | 10/2002 | Levy et al. |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0040957 A1 | 2/2003 | Rodriguez et al. |
| 2003/0105730 A1 | 6/2003 | Davis et al. |
| 2003/0130954 A1 | 7/2003 | Carr et al. |
| 2003/0174861 A1 | 9/2003 | Levy et al. |
| 2003/0187798 A1 | 10/2003 | McKinley et al. |
| 2004/0005093 A1 | 1/2004 | Rhoads |
| 2004/0190750 A1 | 9/2004 | Rodriguez et al. |
| 2004/0199387 A1 | 10/2004 | Wang et al. |
| 2004/0240704 A1 | 12/2004 | Reed |
| 2004/0264733 A1 | 12/2004 | Rhoads et al. |
| 2005/0015802 A1 | 1/2005 | Masson |
| 2005/0028189 A1 | 2/2005 | Heine et al. |
| 2005/0041835 A1 | 2/2005 | Reed et al. |
| 2005/0058318 A1 | 3/2005 | Rhoads |
| 2005/0066181 A1 | 3/2005 | Burns |
| 2005/0120391 A1 | 6/2005 | Haynie et al. |
| 2005/0192933 A1 | 9/2005 | Rhoads et al. |
| 2006/0004630 A1 | 1/2006 | Criddle et al. |
| 2006/0009287 A1 | 1/2006 | Engelfriet |
| 2006/0013435 A1 | 1/2006 | Davis et al. |
| 2006/0041591 A1 | 2/2006 | Rhoads |
| 2006/0251291 A1 | 11/2006 | Rhoads |
| 2007/0055884 A1 | 3/2007 | Rhoads |
| 2007/0108287 A1 | 5/2007 | Davis et al. |
| 2007/0154064 A1 | 7/2007 | Rhoads et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0133555 A1 | 6/2008 | Rhoads et al. |
| 2008/0155633 A1 | 6/2008 | Watson |
| 2008/0276286 A1 | 11/2008 | Robinson et al. |
| 2008/0292134 A1 | 11/2008 | Sharma et al. |
| 2009/0012944 A1 | 1/2009 | Rodriguez et al. |
| 2009/0116673 A1 | 5/2009 | Rhoads et al. |
| 2009/0125475 A1 | 5/2009 | Rhoads et al. |
| 2009/0232352 A1 | 9/2009 | Carr et al. |
| 2009/0286572 A1 | 11/2009 | Rhoads et al. |
| 2009/0290754 A1 | 11/2009 | Rhoads |
| 2010/0027837 A1 | 2/2010 | Levy et al. |
| 2010/0045816 A1 | 2/2010 | Rhoads |
| 2010/0062819 A1 | 3/2010 | Hannigan et al. |
| 2010/0094639 A1 | 4/2010 | Rhoads |
| 2010/0142749 A1 | 6/2010 | Ellingson et al. |
| 2010/0172540 A1 | 7/2010 | Davis et al. |
| 2010/0198941 A1 | 8/2010 | Rhoads |
| 2011/0007936 A1 | 1/2011 | Rhoads |
| 2011/0026777 A1 | 2/2011 | Rhoads et al. |
| 2011/0051998 A1 | 3/2011 | Rhoads |
| 2011/0062229 A1 | 3/2011 | Rhoads |
| 2011/0091066 A1 | 4/2011 | Alattar |

FOREIGN PATENT DOCUMENTS

| | | |
|---|---|---|
| EP | 1019868 B1 | 1/2009 |
| GB | 2327565 A | 1/1999 |
| JP | 7115474 | 5/1995 |
| JP | 10177613 | 6/1998 |
| WO | WO98/14887 | 4/1998 |
| WO | WO98/20642 | 5/1998 |
| WO | WO 98/24050 | 6/1998 |
| WO | WO 98/40823 | 9/1998 |
| WO | WO 98/49813 | 11/1998 |
| WO | WO 99/34277 | 7/1999 |
| WO | WO0201379 | 1/2002 |
| WO | WO0211446 | 2/2002 |
| WO | WO0217633 | 2/2002 |

OTHER PUBLICATIONS

O'Runanaidh, "Rotation, Scale and Translation Invariant Digital Image Watermarking," 1997 IEEE, pp. 536-539, Oct. 1997.

Sheng, "Experiments on Pattern Recognition Using Invariant Fourier-Mellin Descriptors," Journal of Optical Society of America, vol. 3, No. 6, pp. 771-779, Jun. 1986.

"Distributing Uniform Resource Locators as Bar Code Images," IBM Technical Disclosure Bulletin, No. 39, No. 1, pp. 167-168, 96A 60059, Jan. 1996.

"Teaching the printing of bar codes on paper to encode data represented by an icon on a computer screen," IBM Technical Disclosure Bulletin 96A 61092.

U.S. Appl. No. 09/343,104, filed Jun. 29, 1999, Tony F. Rodriguez. et al.
U.S. Appl. No. 09/343,101, filed Jun. 29, 1999, Bruce L. Davis. et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/507,096, filed Feb. 17, 2000, Geoffrey B. Rhoads. et al.
U.S. Appl. No. 09/552,998, filed Apr. 19, 2000, Tony F. Rodriguez. et al.
U.S. Appl. No. 09/567,405, filed May 8, 2000, Geoffrey B. Rhoads. et al.
U.S. Appl. No. 09/629,649, filed Aug. 1, 2000, J. Scott Carr. et al.
U.S. Appl. No. 09/633,587, filed Aug. 7, 2000, Geoffrey B. Rhoads. et al.
U.S. Appl. No. 09/689,289, filed Oct. 11, 2000, Geoffrey B. Rhoads. et al.
U.S. Appl. No. 09/697,009, filed Oct. 25, 2000, Bruce L. Davis. et al.
U.S. Appl. No. 09/697,015, filed Oct. 25, 2000, Bruce L Davis. et al.
U.S. Appl. No. 13/084,981, filed Apr. 12, 2011, Geoffrey B. Rhoads.
Johnson et al., "Recovery of Watermarks from Distorted Images," Proc. 3.sup.rd Int. Workshop on Information Hiding, LNCS vol. 1768, Sep./Oct. 1999, (16 pages).
Kutter, "Watermarking resisting to translation, rotation, and scaling," Proc. SPIE vol. 3528: Multimedia Systems and Applications, Nov. 1998, pp. 423-431.
Su et al., "Synchronized Detection of the Block-based Watermark with Invisible Grid Embedding," Proc. SPIE vol. 4314: Security and Watermarking of Multimedia Contents III, Jan. 2001, pp. 406-417.

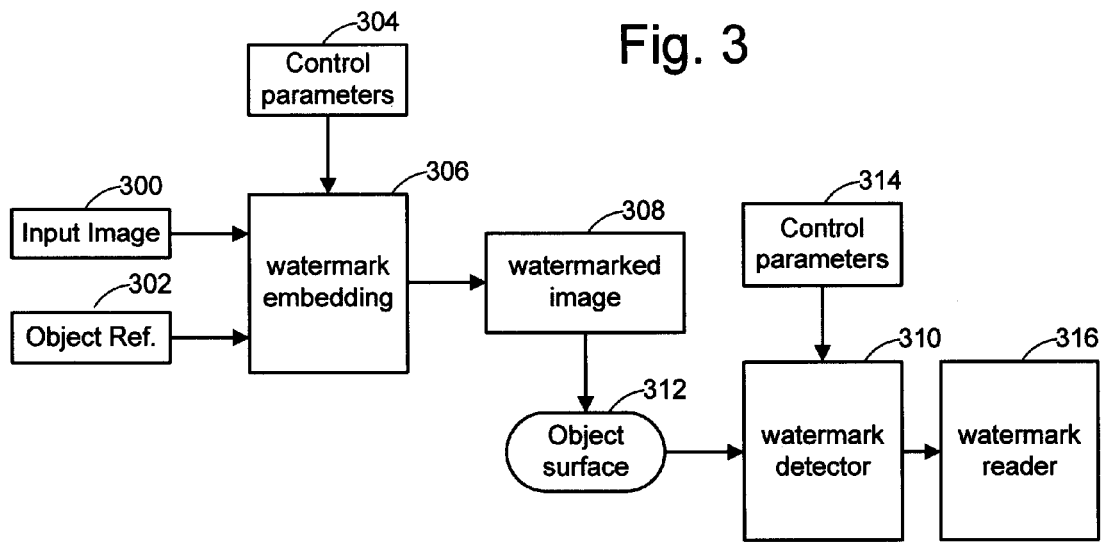
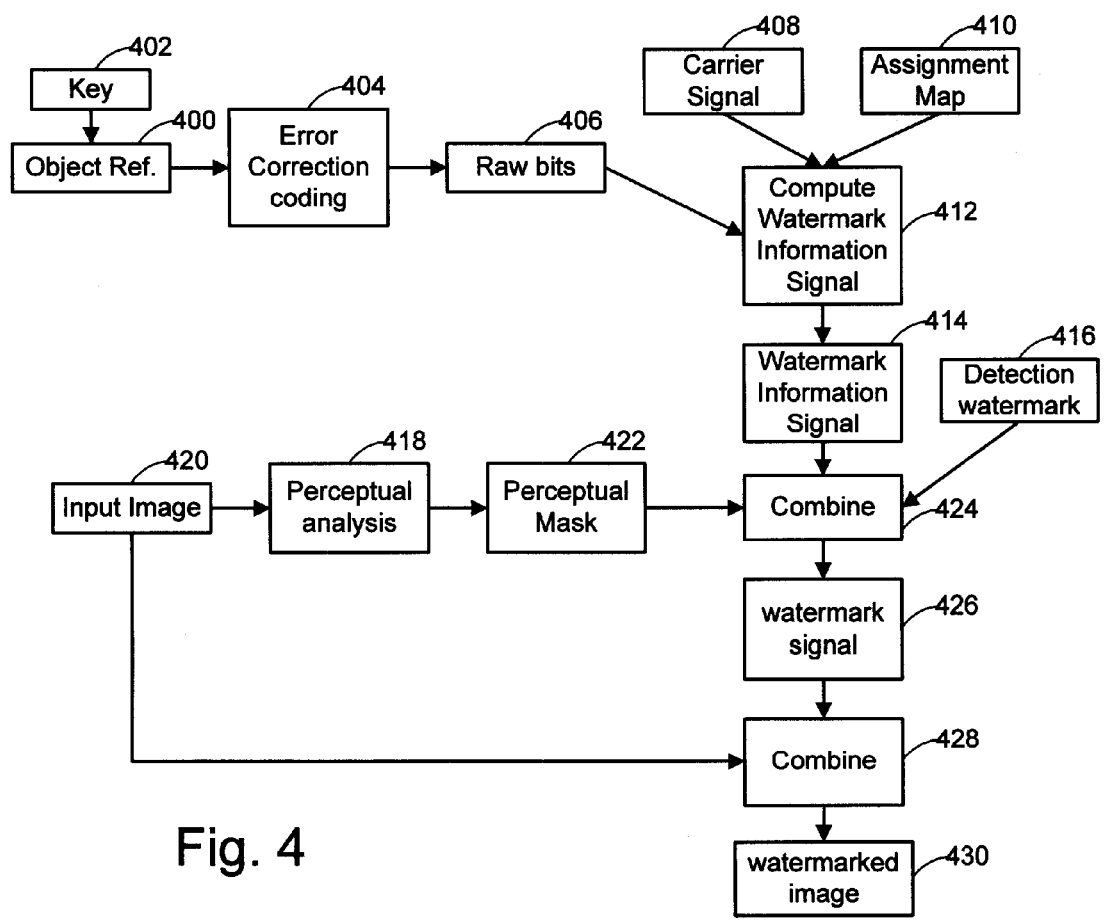

- 600 Image Data
- 602 Transform Image Data
- 604 Perform Correlation
- 606 Orientation Parameters
- 608 Re-orient image

- 700 Re-oriented Image Data
- 702 Scan Pixels
- 704 Compare Pixel with Neighbors
- 706 Map back to Carrier and Raw bit position(s)
- 708 Vote for associated raw bit
- 710 Compile votes to reconstruct raw bits
- 712 Error correction decoding

EMBEDDING AND READING CODES ON OBJECTS

RELATED APPLICATION DATA

This application is a continuation of U.S. patent application Ser. No. 09/452,021, filed Nov. 30, 1999 (now U.S. Pat. No. 7,044,395). The Ser. No. 09/452,021 application is a continuation-in-part of application Ser. No. 09/130,624, filed Aug. 6, 1998 (now U.S. Pat. No. 6,324,573). The Ser. No. 09/452,021 application is also related to application Ser. No. 08/508,083, filed Jul. 27, 1995 (now U.S. Pat. No. 5,841,978).

The Ser. No. 09/452,021 application is also a continuation-in-part of each of application Ser. No. 09/292,569, filed Apr. 15, 1999 (abandoned), Ser. No. 09/314,648, filed May 19, 1999 (U.S. Pat. No. 6,681,028), and Ser. No. 09/343,104, filed Jun. 29, 1999 now abandoned.

The Ser. No. 09/452,021 application also claims the benefit of U.S. Provisional Application Nos. 60/158,015, filed Oct. 6, 1999, 60/163,332, filed Nov. 3, 1999, and 60/164,619, filed Nov. 10, 1999.

This application is related to application Ser. No. 09/452,023, filed Nov. 30, 1999 (now U.S. Pat. No. 6,408,082) and Ser. No. 09/452,022, filed Nov. 30, 1999 (now U.S. Pat. No. 6,959,098). The technology disclosed in this application can advantageously be used in the methods and systems disclosed in the foregoing patents and applications (all of which are incorporated by reference).

TECHNICAL FIELD

The disclosure relates to embedding and reading machine-readable codes on objects, audio and video.

BACKGROUND AND SUMMARY

There are a variety standard ways to encode information in a machine-readable code that is either affixed to or applied to the surface of a tangible object. Perhaps the most widespread form of machine-readable code is the barcode, but there are many others. Other forms of machine-readable identification include magnetic stripe, magnetic ink character recognition (MICR), optical character recognition (OCR), optical mark recognition (OMR), radio frequency identification (RF/ID) etc.

While these forms of machine-readable identification are widely used and effective for many applications, they all have the disadvantage that they must occupy a dedicated portion of the physical object that they reside on. For example, if one wishes to apply a barcode or magnetic stripe to an object, the physical implementation of the code must occupy some portion of the object's surface apart from the other information content on the object. For some applications, this limitation does not pose a problem. For many applications, however, the need to locate the code on a dedicated portion of the object is a significant drawback. One drawback is that it requires the user to position the object so that the portion carrying the code can be read. Another drawback is that the code is not aesthetically pleasing, and may detract from the overall appearance of the object. In addition, the placement of the code may require an expensive and cumbersome manufacturing and application process.

Another characteristic of these forms of machine-readable identification is that they are perceptible to the users of the object. Again, for many applications, this characteristic is not a concern, and may in fact be a benefit. In some cases, however, it is a disadvantage for the code to be visually perceptible. As noted above, one drawback is that it detracts from the aesthetic appearance of the object. Another drawback is that it may be more likely to be tampered with.

Watermarks provide an alternative machine-readable code that addresses some or all of these drawbacks. Watermarks may be embedded in the information content (e.g., an image or graphics) or texture of an object's surface, and thus, do not require a separate, dedicated portion of the surface area. While some forms of image watermarks are visible, others may be embedded in image content such that they are virtually imperceptible to the user, yet readable by a machine.

In the following detailed description, watermarks and related machine-readable coding techniques are used to embed data within the information content on object surfaces. These techniques may be used as a substitute for (or in combination with) standard machine-readable coding methods such as bar codes, magnetic stripes, etc. As such, the coding techniques extend to many applications, such as linking objects with network resources, retail point of sale applications, object tracking and counting, production control, object sorting, etc. Object message data, including information about the object, machine instructions, or an index, may be hidden in the surface media of the object.

An object messaging system includes an embedder and reader. The embedder converts an object message to an object reference, and encodes this reference in a watermarked signal applied to the object. The reader detects the presence of a watermark and decodes the watermark signal to extract the object reference.

Further features and advantages will become apparent with reference to the following detailed description and accompanying drawings.

BRIEF DESCRIPTION OF THE DRAWINGS

FIG. 3 is a diagram illustrating an image watermark embedding and reading system for marking objects.

FIG. 4 is a block diagram illustrating an implementation of an image watermark embedder.

DETAILED DESCRIPTION

Overview of Watermark System

The primary components of a watermarking system are an embedder and a reader. The embedder encodes information into a watermark and applies it to an object, while the reader detects the watermark and decodes its information content.

Figure 1:
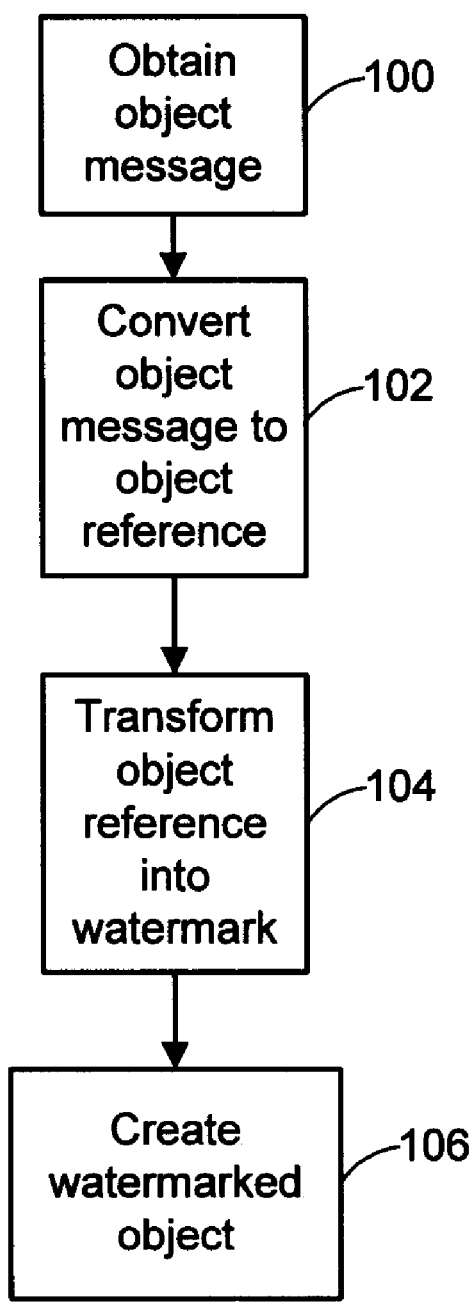
FIG. 1 is a flow diagram illustrating an overview of a watermarking embedding process.

FIG. 1 is a flow diagram illustrating an overview of the embedding process. While advantageous to perform automatically, some of the steps may be performed manually, and may be implemented in distinct system components.

The process begins by obtaining an object message (100). In this context, an object message is a general term referring to information associated with an object, including object identifiers, an index to other information or instructions, and machine instructions. For example, the message may be a product identifier such as a Universal Product Code (UPC). For many applications, it is advantageous to leverage an existing object messaging scheme such as a UPC symbology, a magnetic stripe coding format, or some other extrinsic standard. However, it is also possible to develop a customized messaging scheme tailored to meet the demands of a particular application.

Next, the object message is converted into an object reference (102). The objective of this stage is to place the message in a data format suitable for transforming into a watermark signal. In some instances, the message may already be in a data format that can be directly converted to a watermark information signal (e.g., a binary number). In this case, there is no need to transform the object message into a different data format. In other instances, the object message may be expressed as a numeric or alphanumeric string representing some coded format. In this case, the embedding process decodes and transforms the message into a form suitable for conversion to watermark. This process may involve, for example, decoding and mapping each character or groups of adjacent characters into a binary number.

Next, the object reference is transformed into a watermark signal (104). The watermark signal defines how to manipulate the information content conveyed on the object's surface so as to place a watermark on the object. The specific details of this process depend on the nature of the watermark.

The watermark may be embedded in the information content of a digital image, for example. A digital image is comprised of a two or more dimensional array of image samples. In this case, the image sample values are manipulated to embed the watermark signal in the image. The term "image sample" refers generally to a discrete value in the image array. The image sample constitutes a value in any one of several domains, such as a spatial or frequency domain. In any given domain, image content may be represented in a variety of standard or custom formats or color spaces. A color space may have one or more dimensions. For example, a monochrome image typically has a single dimension representing a gray-scale value, while a color image typically has three dimensions, e.g., RGB (Red, Green, and Blue); or YUV (Luminance, and two Chrominance components).

While a digital watermark is typically applied to digital content, it may be implemented so as to remain with the content even through transformations to and from the analog domain. In addition to images, it applies to a variety of different media types, including audio and video.

The assignee's watermarking technology is reflected in U.S. Pat. No. 5,862,260 and laid-open PCT Application WO97/43736 (corresponding to U.S. patent application Ser. No. 08/746,613, now U.S. Pat. No. 6,122,403).

Another way to encode additional information in an image is in the form of a data glyph. An implementation of data glyphs is described in U.S. Pat. No. 5,315,098. Related visible watermarking work is illustrated in U.S. Pat. Nos. 5,706,364, 5,689,620, 5,684,885, 5,680,223, 5,668,636, 5,640,647, 5,594,809.

Alternatively, the watermark may be embedded in line graphics or text by varying the position of lines or characters in a manner that encodes the object reference.

In summary, watermarking can be applied to myriad forms of information. These include imagery (including video) and audio—whether represented in digital form (e.g., an image comprised of pixels, digital video, etc.), or in an analog representation (e.g., non-sampled music, printed imagery, banknotes, etc.). Watermarking can be applied to digital content (e.g. imagery, audio) either before or after compression (MPEG2, MPEG4, MP3). Watermarking can also be used in various "description" or "synthesis" language representations of content, such as Structured Audio, Csound, NetSound, SNHC Audio and the like (c.f. http://sound.media-a.mit.edu/mpeg4/) by specifying synthesis commands that generate watermark data as well as the intended audio signal.

Watermarking can also be applied to ordinary media, whether or not it conveys information. Examples include paper, plastics, laminates, paper/film emulsions, etc. A watermark can embed a single bit of information, or any number of bits.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminescence, etc. The surface texture of an object may be altered to create a watermark pattern. This may be accomplished by manufacturing an object in a manner that creates a textured surface or by applying material to the surface (e.g., an invisible film or ink) in a subsequent process. Watermarks can also be optically implemented in holograms and conventional paper watermarks.

When determining how to implement this aspect of the embedder, there are a number of design objectives to consider. One objective to consider is the degree to which the watermark is imperceptible upon ordinary inspection. As the watermark becomes less perceptible, it may also become more difficult to detect and read accurately. Another objective is the quantity of information that one wishes to embed in the watermark. As the quantity of information increases, the watermark will need to support larger object references. Yet another objective is security. In some applications, it is desirable to employ an object reference scheme that makes the object references more difficult to decipher or remove from the objects.

Having created a watermark signal, the embedder creates the watermarked object (106). As referenced above, this process may involve printing or applying a watermarked image to the surface of the object, or texturing the surface of the object so as to impart the watermark to the object.

Figure 2:
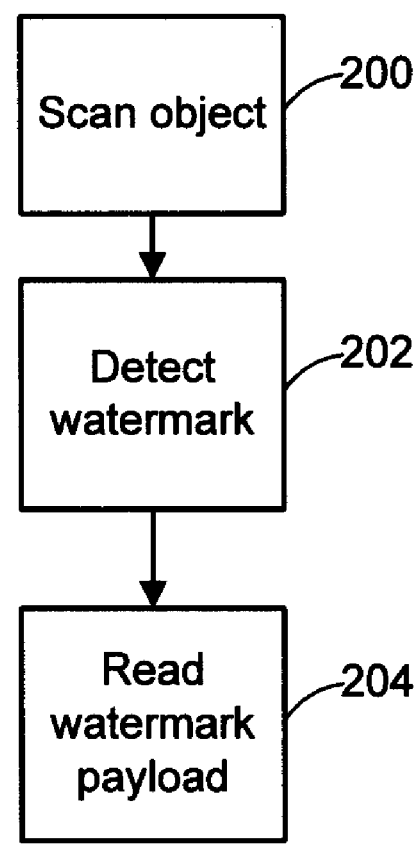
FIG. 2 is a flow diagram illustrating an overview of a watermark reading process.

Once embedded in the object, the object reference serves as a machine-readable code that conveys information about the object, a machine instruction or instructions, or an index to information or instructions. Any compatible reader may extract the object reference. FIG. 2 is a flow diagram illustrating an overview of the reading process. Typically, the reader system incorporates a combination of hardware and software elements. First, the reader scans the object surface to capture a digital representation of the surface (e.g., an image, or map of surface topology) (200). Next, the reader processes the surface representation to detect whether a watermark is present (202). If so, the reader proceeds to read the watermark payload (204). In some implementations, a separate detection process is not performed.

Example Implementations of Digital Image Watermark Embedder and Reader

The following sections describe implementations of a watermark embedder and reader that operate on digital images. The embedder encodes the object reference into a digital image by modifying its image sample values such that the object reference is imperceptible to the ordinary observer in the output image. The embedder prints the output image on the surface of the object. To extract the object reference, the reader captures an image of the object and then processes it to detect the watermark and decode the object reference.

FIG. 3 is a block diagram summarizing image processing operations involved in embedding and reading a watermark. There are three primary inputs to the embedding process: the original, digitized image 300, the object reference 302, and a series of control parameters 304. The control parameters may include one or more keys. One key may be used to encrypt the object reference. Another key may be used to control the generation of a watermark carrier signal or a mapping of information bits in the object reference to positions in a watermark information signal. Other parameters may include control bits added to the object reference, and a watermark detection pattern used to assist in the detection of the watermark. The watermark embedding process 306 performs a watermarking function on the object reference to convert it to a watermark information signal. It then combines this signal with the input image and the detection pattern to create a watermarked image 308.

The watermark detector 310 operates on a digitized image captured from the marked object 312. Using parameters 314 from the embedder (e.g., detection pattern, control bits, key(s)), it performs a series of correlation or other operations on the captured image to detect the presence of a watermark. If it finds a watermark, it determines its orientation within the image. After re-orienting the data, the reader 316 extracts the object reference. Some implementations do not perform correlation, but instead, use some other detection process or proceed directly to extract the watermark signal.

The Embedder

FIG. 4 is a block diagram illustrating an implementation of an embedder in more detail. The embedding process begins with the object reference 400. As noted above, the object reference is binary number suitable for conversion to a watermark signal. For additional security, it may be encrypted with an encryption key 402. In addition to the information conveyed in the object message, the embedder may also add control bit values to the object reference to assist in verifying the accuracy of a read operation. These control bits, along with the bits representing the object message, are input to an error correction coding process 404 designed to increase the likelihood that the object message can be recovered accurately in the reader.

There are several alternative error correction coding schemes that may be employed. Some examples include BCH ("trellis") and convolution coding. These forms of error correction coding are sometimes used in communication applications where data is encoded in a carrier signal that transfers the encoded data from one place to another. In the digital watermarking application discussed here, the raw bit data is encoded in the fundamental carrier signal. Other forms of error correction coding include turbo codes.

In addition to the error correction coding schemes mentioned above, the embedder and reader may also use a Cyclic Redundancy Check (CRC) to facilitate detection of errors in the decoded object reference data.

The error correction coding function 404 produces a string of bits, termed raw bits 406, that are embedded into a watermark information signal. Using a carrier signal 408 and an assignment map 410, the embedder encodes the raw bits in a watermark information signal 412, 414. The carrier signal is essentially a noise image. For each raw bit, the assignment map specifies the corresponding image sample or samples that will be modified to encode that bit.

The embedder depicted in FIG. 4 operates on blocks of image data (referred to as 'tiles') and replicates a watermark in each of these blocks. As such, the carrier signal and assignment map both correspond to an image block of a pre-determined size, namely, the size of the tile. To encode each bit, the embedder applies the assignment map to determine the corresponding image samples in the block to be modified to encode that bit. Using the map, it finds the corresponding image samples in the carrier signal block. For each bit, the embedder computes the value of image samples in the watermark information signal as a function of the raw bit value and the value(s) of the corresponding samples in the carrier signal block.

To illustrate the embedding process further, it is helpful to consider an example. First, consider the following background. Digital watermarking processes are sometimes described in terms of the transform domain in which the watermark signal is defined. The watermark may be defined in the spatial domain, or some other transform domain such as a wavelet transform, DCT, Fourier transform, or Karhunen-Loeve transform (KLT) domain.

Now consider an example where the watermark is defined in the spatial domain and the tile size is 128 by 128 pixels. In this example, the assignment map specifies the corresponding sample location or locations in the tile that correspond to each bit position in the raw bits. In the spatial domain, the carrier signal looks like a noise pattern extending throughout the tile. Each image sample in the spatial domain of the carrier signal is used together with a selected raw bit value to compute the value of the image sample at the same location in the watermark information signal.

With this background, the embedder proceeds to encode each raw bit as follows. It uses the assignment map to look up the position of the corresponding image sample (or samples) in the carrier signal. The image sample value at that position in the carrier controls the value of the corresponding position in the watermark information signal. In particular, the carrier sample value indicates whether to invert the corresponding watermark sample value. The raw bit value is either a one or zero. Disregarding for a moment the impact of the carrier signal, the embedder adjusts the corresponding watermark sample upward to represent a one, or downward to represent a zero. Now, if the carrier signal indicates that the corresponding sample should be inverted, the embedder adjusts the watermark sample downward to represent a one, and upward to represent a zero. In this manner, the embedder computes the value of the watermark samples for a raw bit using the assignment map to find the spatial location of those samples within the block.

From this example, a number of points can be made. First, the embedder may perform a similar approach in any transform domain. Second, for each raw bit, the corresponding watermark sample or samples are some function of the raw bit value and the carrier signal value. The specific mathematical relationship between the watermark sample, on one hand, and the raw bit value and carrier signal, on the other, may vary with the implementation. Third, the carrier signal may remain constant for a particular application, or it may vary from one message to another. For example, a secret key may be used to generate the carrier signal pattern. For each raw bit, the assignment map may define a pattern of watermark samples in the transform domain in which the watermark is defined. An assignment map that maps a raw bit to a pixel location or set of locations (i.e. a spatial map) is just one special case of an assignment map for a transform domain. Fourth, the assignment map may remain constant, or it may vary from one message to another. In addition, the carrier signal and map may vary depending on the nature of the underlying image. In sum, there many possible design choices within the implementation framework described above.

The embedder depicted in FIG. 4 combines another watermark component, shown as the detection watermark 416, with the watermark information signal to compute the final watermark signal. The detection watermark is specifically chosen to assist in identifying the watermark and computing its orientation in a detection operation.

Figure 5:
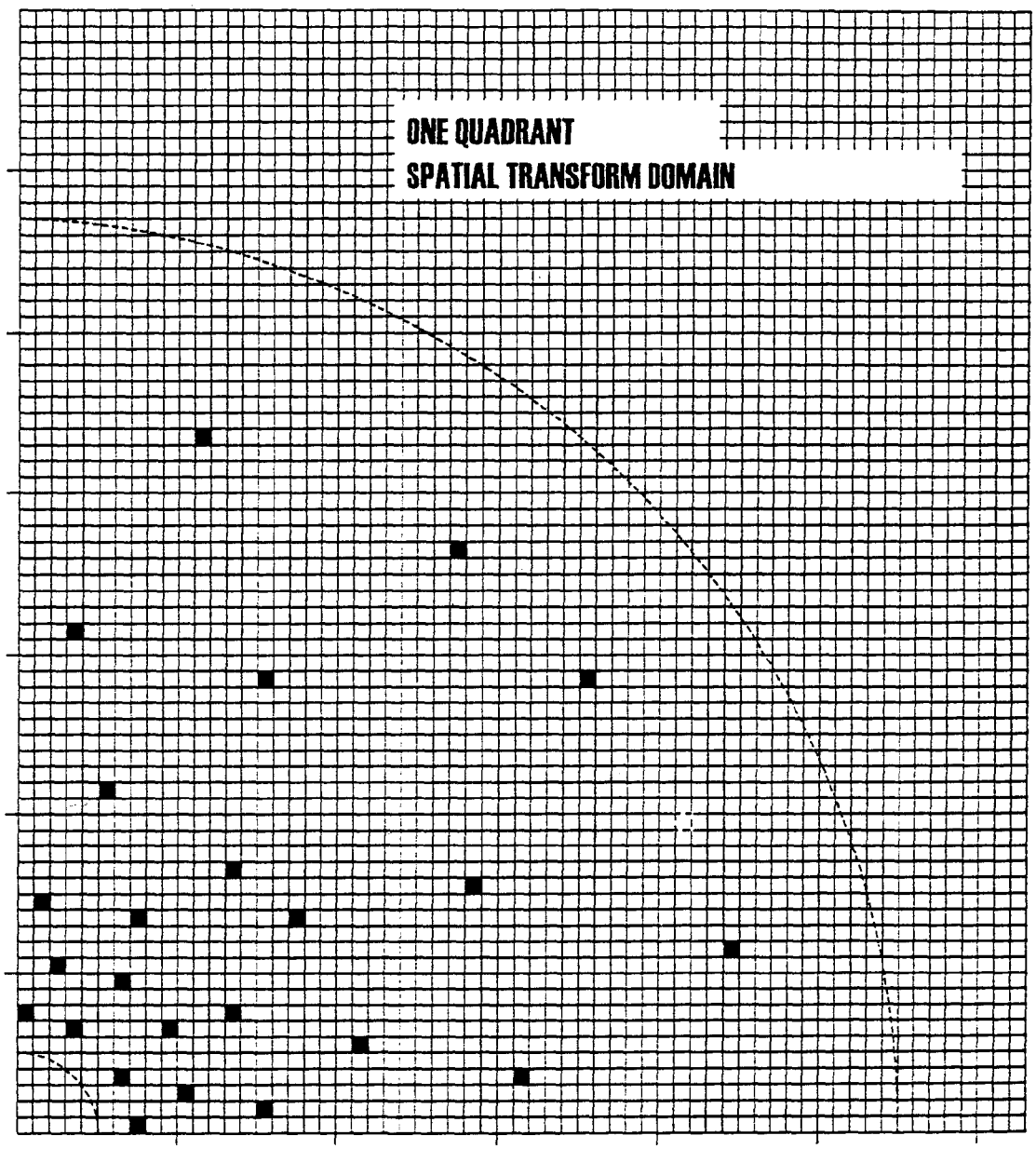
FIG. 5 is a spatial frequency plot illustrating one quadrant of a detection watermark.

FIG. 5 is a spatial frequency plot illustrating one quadrant of a detection watermark. The points in the plot represent impulse functions (also referred to as grid points), indicating signal content of the detection watermark signal. The pattern of grid points for the illustrated quadrant is replicated in all four quadrants. There are a number of properties of the detection pattern that impact its effectiveness for a particular application. The selection of these properties is highly dependent on the application. One property is the extent to which the pattern is symmetric about one or more axes. For example, if the detection pattern is symmetrical about the horizontal and vertical axes, it is referred to as being quad symmetric. If it is further symmetrical about diagonal axes at an angle of 45 degrees, it is referred to as being octally symmetric (repeated in a symmetric pattern 8 times about the origin). Such symmetry aids in identifying the watermark in an image, and aids in extracting the rotation angle. However, in the case of an octally symmetric pattern, the detector includes an additional step of testing which of the four quadrants the orientation angle falls into.

Another criterion is the position of the grid points and the frequency range that they reside in. Preferably, the grid points fall in a mid frequency range. If they are located in a low frequency range, they may be noticeable in the watermarked image. If they are located in the high frequency range, they are more difficult to recover. Also, they should be selected so that scaling, rotation, and other manipulation of the watermarked signal does not push the grid points outside the range of the detector. Finally, the grid points should preferably not fall on the vertical or horizontal axes, and each grid point should have a unique horizontal and vertical location.

Returning to FIG. 4, the embedder makes a perceptual analysis 418 of the input image 420 to identify portions of the image that can withstand more watermark signal content without substantially impacting image fidelity. Generally, the perceptual analysis identifies portions where there is more image activity. In these areas, the sample values are changing more than other areas and have more signal strength. The output of the perceptual analysis is a perceptual mask 422 that represents signal activity. For example, the mask may be implemented as an array of multipliers, which selectively increase the signal strength of the watermark information and detection signals in areas of greater signal activity.

The embedder combines (424) the watermark information and detection signals and then applies the perceptual mask to yield the watermark signal 426. Finally, it combines (428) the input image 420 and the watermark signal 426 to create the watermarked image 430. In the spatial watermark example introduced above, the embedder adds the image samples in the watermark signal to the corresponding samples in the input image to create the watermarked image 430. In other implementations, the embedder may perform alternative functions to combine the watermark signal and the input image (e.g., multiplication). The net effect is that some image samples in the input image are adjusted upward, while others are adjusted downward. The extent of the adjustment is greater in areas of the image having greater signal activity.

The Detector and Reader

Figure 6:
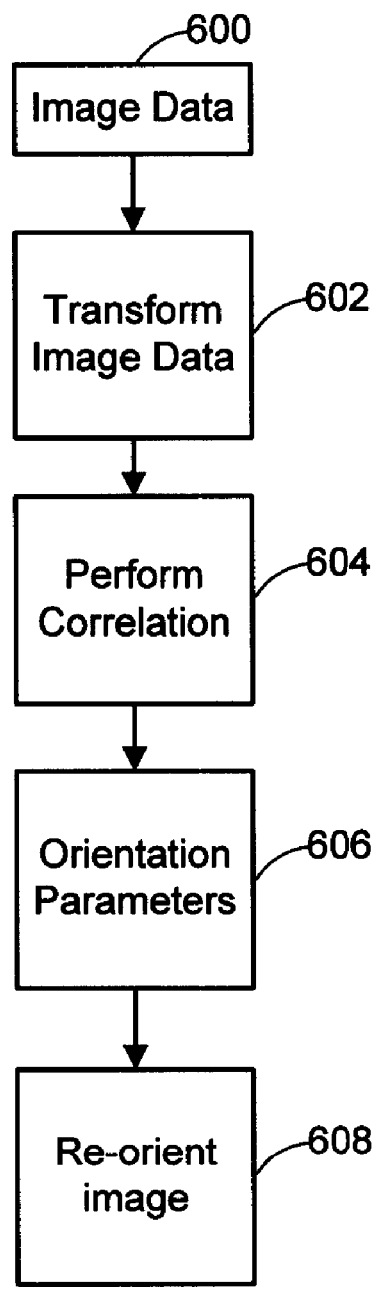
FIG. 6 is a flow diagram illustrating an implementation of an image watermark detector.

FIG. 6 is a flow diagram illustrating an overview of a watermark detection process. This particular approach performs a series of transforms and re-mappings of the image data 600 to enhance the efficiency of correlation processes used to search for the detection pattern in the target image. First, the detector transforms the image data to another domain 602, namely the spatial frequency domain, and then performs a series of correlation or other detection operations 604. The correlation operations match the detection pattern with the target image data to detect the presence of the watermark and its orientation parameters 606 (e.g., translation, scale, rotation, and differential scale relative to its original orientation). Finally, it re-orients the image data based on one or more of the orientation parameters 608.

Figure 7:
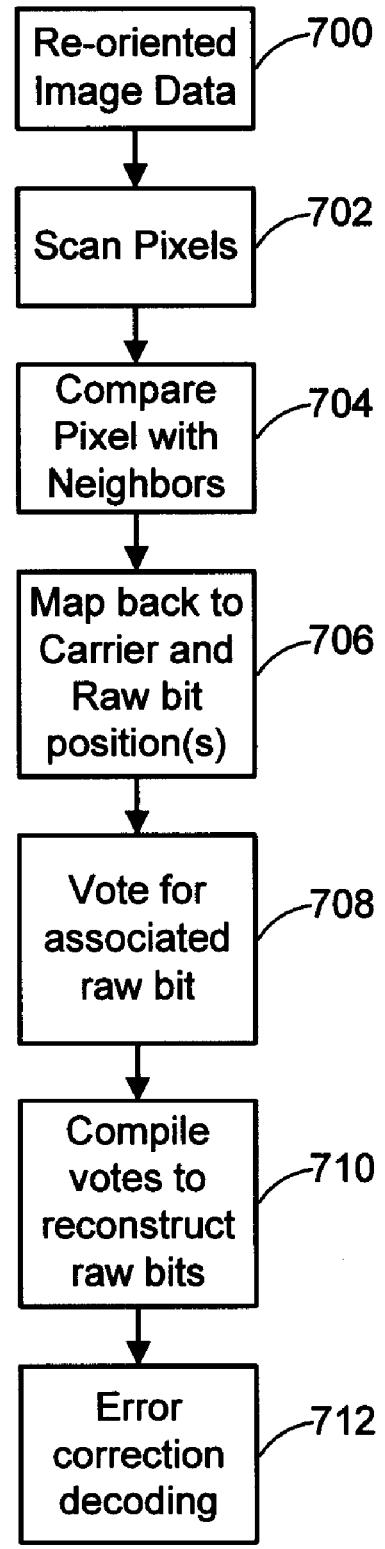
FIG. 7 is a flow diagram illustrating an implementation of an image watermark reader.

If a watermark is detected, the reader extracts the watermark information signal from the re-oriented image data. FIG. 7 is flow diagram illustrating a process of extracting the object reference information from the re-oriented image data 700. The reader scans the image samples (e.g., pixels) of the re-oriented image (702), and compares each one with its neighbors 704. Recall that the embedder adjusted pixel values up or down to create the watermark information signal. The reader uses this attribute of the watermark to extract it from the target image. If an image sample value is sufficiently greater or less than its neighbors, then it is a candidate for further analysis in the reading process. As such, the reader evaluates the value of the image sample relative to its neighbors to determine how it differs from its neighbors. If the difference is significant, then the sample is a candidate for containing some portion of the watermark signal.

For each such candidate, the reader uses the assignment map to find the corresponding raw bit position and image sample in the carrier signal (706). The value of the raw bit is a function of how the candidate differs from its neighbors, and the carrier signal at the corresponding location in the carrier. For instance, in the example provided above, the carrier signal indicates whether to invert the bit value, while the difference between the candidate and its neighbors indicates whether the bit value should be interpreted as a one or zero. As reflected generally in FIG. 7 (708), the result of this computation represents only one vote to be analyzed along with other votes impacting the value of the corresponding raw bit. Some votes may indicate that the raw bit is likely to be a one, while others may indicate that it is a zero. After the reader completes its scan, it compiles the votes for each bit position in the raw bit string, and makes a determination of the value of each bit at that position (710). Finally, it performs the inverse of the error correction coding scheme to construct the object reference (712). In some implementations, probablistic models may be employed to determine the likelihood that a particular pattern of raw bits is just a random occurrence rather than a watermark.

Example Illustrating Detector Process

Figure 8:
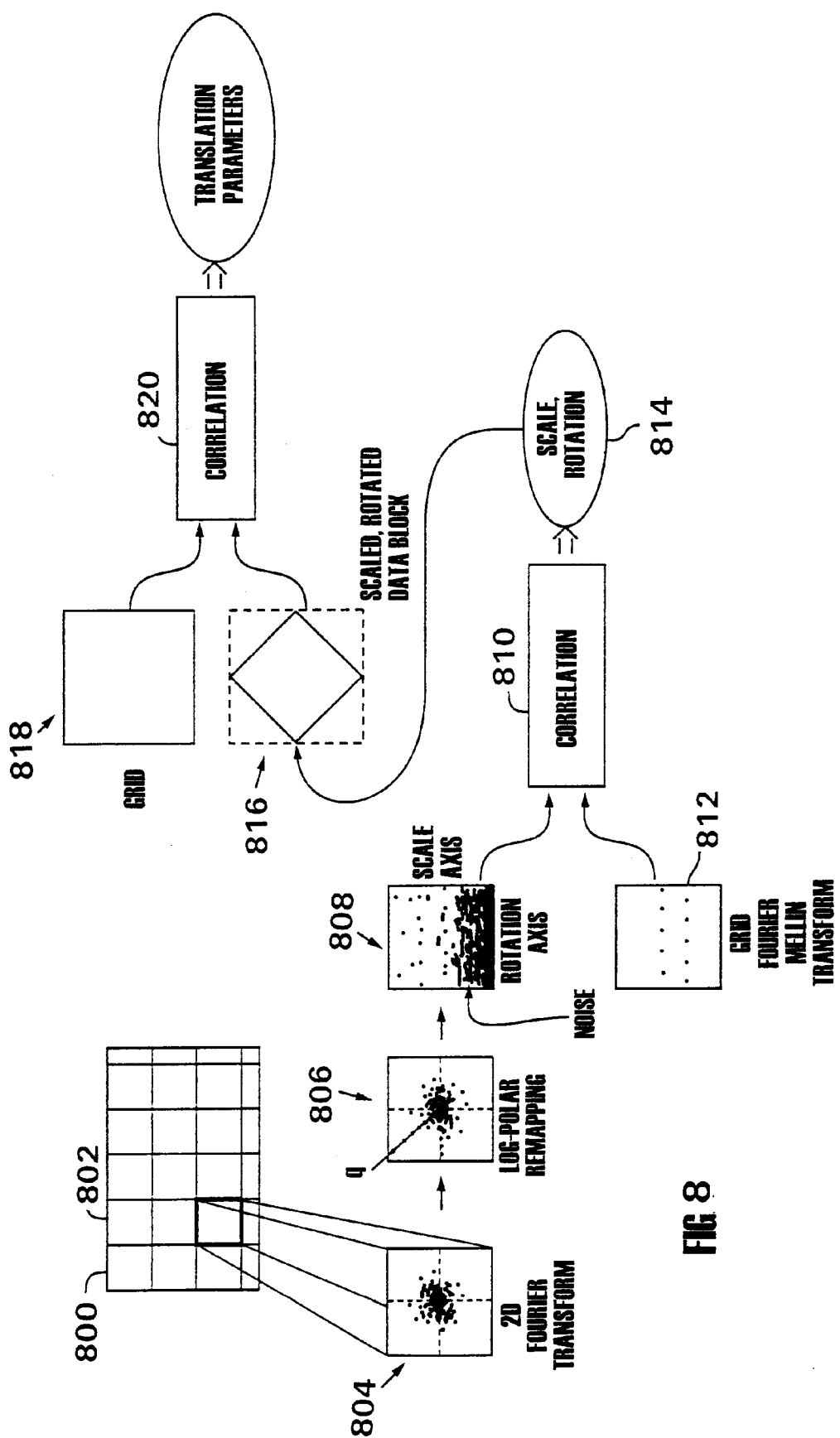
FIG. 8 is a diagram depicting an example of an image watermark detection process.

FIG. 8 is a diagram depicting an example of a watermark detection process. the detector segments the target image into blocks (e.g., 800, 802) and then performs a 2-dimensional fast fourier transform (2D FFT) on each block. This process yields a 2D transform of the magnitudes of the image content of the block in the spatial frequency domain as depicted in the plot 804 shown in FIG. 8.

Next, the detector process performs a log polar remapping of the transformed block. The type of remapping in this implementation is referred to as a Fourier Mellin transform. The Fourier Mellin transform is a geometric transform that warps the image data from a frequency domain to a log polar coordinate system. As depicted in the plot 806 shown in FIG. 8, this transform sweeps through the transformed image data along a line at angle θ, mapping the data to a log polar coordinate system shown in the next plot 808. The log polar coordinate system has a rotation axis, representing the angle θ, and a scale axis. Inspecting the transformed data at this stage, one can see the grid points of the watermark begin to be distinguishable from the noise component (i.e., the image signal).

Next, the detector performs a correlation 810 between the transformed image block and the transformed grid 812. At a high level, the correlation process slides the grid over the transformed image (in a selected transform domain, such as a spatial frequency domain) and measures the correlation at an array of discrete positions. Each such position has a corresponding scale and rotation parameter associated with it. Ideally, there is a position that clearly has the highest correlation relative to all of the others. In practice, there may be several candidates with a promising measure of correlation. As explained further below, these candidates may be subjected to one or more additional correlation stages to select the one that provides the best match for the grid pattern.

There are a variety of ways to implement the correlation process. Any number of generalized matching filters may be implemented for this purpose. One such filter, referred to as a Fourier Magnitude filter, performs an FFT on the target and the grid multiplies the resulting arrays together to yield a multiplied FFT. The filtering operation is a form of convolution of the grid with the target image. In particular, the filter repeatedly re-positions, multiplies the corresponding samples of the grid and target, and accumulates the result at the corresponding location in the resulting array. Finally, it performs an inverse FFT on the multiplied FFT to return the data into its original log-polar domain. The position or positions within this resulting array with the highest magnitude represent the candidates with the highest correlation.

When there are several viable candidates, the detector selects a set of the top candidates and applies an additional correlation stage. Each candidate has a corresponding rotation and scale parameter. The correlation stage rotates and scales the FFT of the grid and performs a matching operation with the rotated and scaled grid on the FFT of the target image. The matching operation multiplies the values of the transformed grid with sample values at corresponding positions in the target image and accumulates the result to yield a measure of the correlation. The detector repeats this process for each of the candidates and picks the one with the highest measure of correlation. As shown in FIG. 8, the rotation and scale parameters (814) of the selected candidate are then used to find additional parameters that describe the orientation of the watermark in the target image.

The detector applies the scale and rotation to the target data block 816 and then performs another correlation process between the grid 818 and the scaled and rotated data block 816. The correlation process 820 is a generalized matching filter operation. It provides a measure of correlation for an array of positions that each has an associated translation parameter (e.g., an x, y position). Again, the detector may repeat the process of identifying promising candidates (i.e. those that reflect better correlation relative to others) and using those in an additional search for a parameter or set of orientation parameters that provide a better measure of correlation.

At this point, the detector has recovered the following orientation parameters: rotation, scale and translation. For many applications, these parameters may be sufficient to enable accurate reading of the watermark. In the read operation, the reader applies the orientation parameters to re-orient the target image and then proceeds to extract the watermark signal. In some applications, the watermarked image may be stretched more in one spatial dimension than another. This type of distortion is sometimes referred to as differential scale or shear. Consider that the original image blocks are square. As a result of differential scale, each square may be warped into a parallelogram with unequal sides. Differential scale parameters define the nature and extent of this stretching.

Differential Scale

There are several alternative ways to recover the differential scale parameters. One general class of techniques is to use the known parameters (e.g., the computed scale, rotation, and translation) as a starting point to find the differential scale parameters. Assuming the known parameters to be valid, this approach warps either the grid or the target image with selected amounts of differential scale and picks the differential scale parameters that yield the best correlation.

Another approach to determination of differential scale is set forth in application Ser. No. 09/452,022 (now U.S. Pat. No. 6,959,098).

Example Illustrating Reader Process

Figure 9:
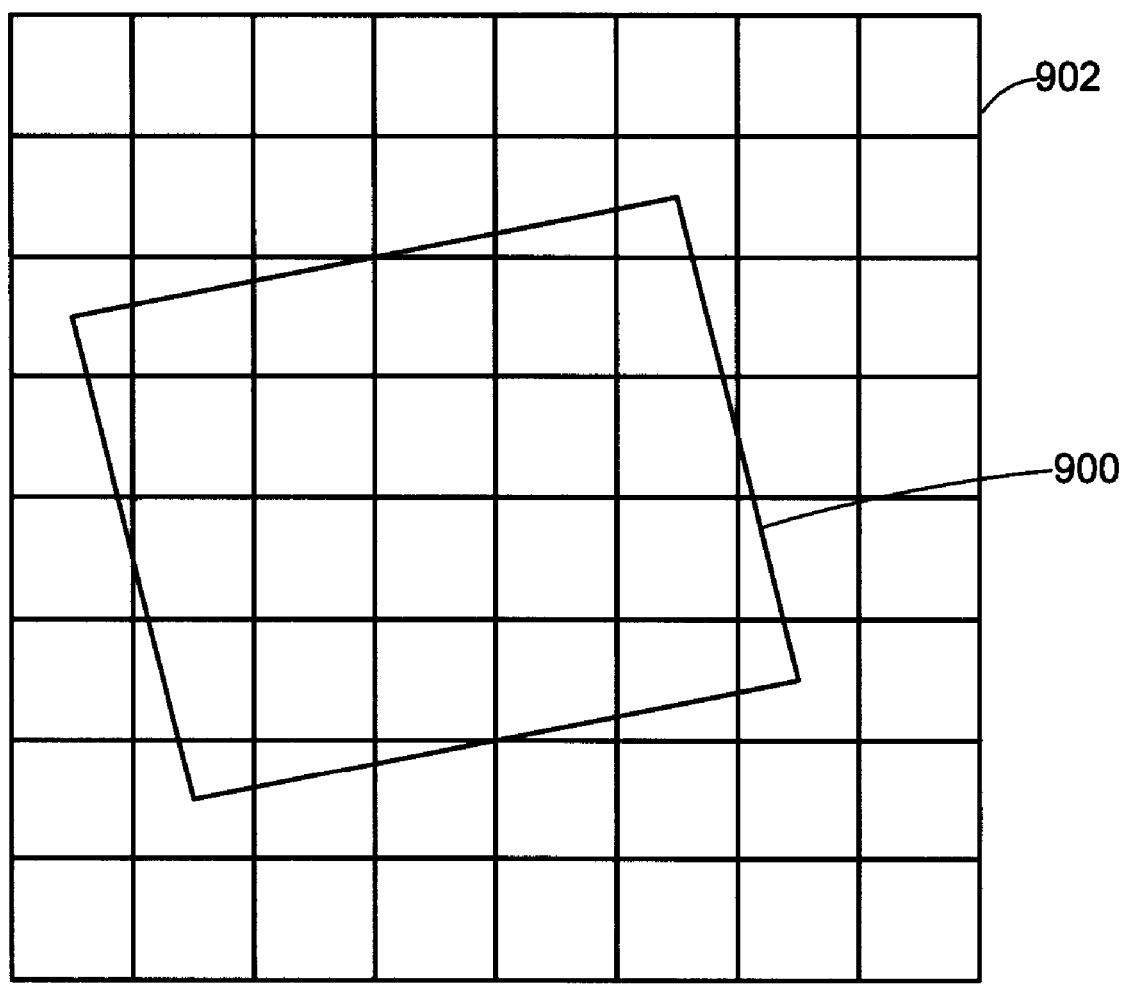
FIG. 9 is a diagram illustrating aspects of an image watermark reading process.

FIG. 9 is a diagram illustrating a re-oriented image 900 superimposed onto the original watermarked image 902. The original watermarked image is sub-divided into tiles (e.g., 128 by 128 pixel blocks 904, 906, etc.). When superimposed on the coordinate system of the original image 902 shown in FIG. 9, the target image blocks typically do not match the orientation of the original blocks.

The reader scans each pixel of the re-oriented image, comparing its value to neighboring pixel values. If the pixel value is greater or less than its neighbors by some predetermined threshold, the reader determines its corresponding sample in the fundamental carrier signal. The assignment map indicates the corresponding sample in the fundamental carrier signal for each position in the re-oriented image. The carrier deduces a value of the corresponding raw bit based on: 1) whether the pixel value is greater than or less than its neighbor; 2) whether the corresponding carrier signal indicates that the value has been inverted. The deduced value becomes a vote for the value of the corresponding raw bit value, along with other values deduced from other pixels in the re-oriented image.

In one implementation, the embedder subdivides the original input image into tiles of 128 by 128 pixels. The object reference signal, before error correction encoding, is a total of 90 bits, including 4 bits specifying a generation number, 10 bits specifying message type, and 76 bits of message field. Through the error correction coding process, this 90 bit string becomes some greater number of bits (e.g., 128, 512, etc.).

Consider the case where there are 512 error-coded bits. Each of these 512 bits is distributed in a watermark signal in a tile. In particular, each raw bit maps to two positions in each of 16 sub-blocks (32 by 32 pixel blocks) within the tile. Note that there are 1024 pixel positions within a 32 by 32 block. Each one of the 512 bits maps to a unique pair of pixel positions within the sub-block. For each such pair of pixel positions, the carrier signal indicates that the watermark signal at one location will add to the original image, while the other will subtract from the original image. Knowing that the assignment map and fundamental carrier signal have these attributes, the reader directly computes the votes for each raw bit value as it scans through the re-oriented image.

The information encoded in the raw bit string can be used to increase the accuracy of read operations. For instance, in the implementation, some of the raw bits (e.g., 50-200 bits) perform a validity checking function. Unlike the object message information, the reader knows the values of these validity bits. The reader can assess the validity of a read operation based on the extent to which the extracted validity bit values match the expected validity bit values. The votes for a given raw bit value can then be given a higher weight depending on whether they are derived from a tile with a greater measure of validity.

Conversion of Standard Machine-Readable Codes to Digital Watermarks

Current machine-readable codes such as bar codes typically encode a numeric or alphanumeric character string. This string acts as an object message that may be used to encode a variety of information about the object with which it is associated. Just as this string can be implemented in existing machine-readable codes for objects, it can also be implemented in a digital watermark applied to objects. As a result, digital watermarks may be used as a replacement for a wide variety of applications currently using conventional machine-readable codes, e.g., according to extrinsic standards such as those established by ANSI, UCC, EAN, etc.

One typically starts the development of an object marking application by devising an object messaging scheme for encoding information within objects. The implementer may create a new messaging scheme or leverage existing object messaging schemes.

Bar Codes

Existing bar code messaging schemes may be used in object marking applications that employ digital watermarks as a replacement for bar codes. Over the years, a number of standards organizations and private entities have formed symbology standards for bar codes. Some examples of standards bodies include the Uniform Code Council (UCC), European Article Numbering (EAN, also referred to as International Article Numbering Association), Japanese Article Numbering (JAN), Health Industry Bar Coding Counsel (HIBC), Automotive Industry Action Group (AIAG), Logistics Application of Automated Marking and Reading Symbols (LOG-MARS), Automatic Identification Manufacturers (AIM), American National Standards Institute (ANSI), and International Standards Organization (ISO).

The UCC is responsible for the ubiquitous bar code standard called the Universal Product Code (UPC). AIM manages standards for industrial applications and publishes standards called Uniform Symbology Standards (USS).

Some well know bar code schemes include UPC and UCC/EAN-128, Codabar developed by Pitney Bowes Corporation, I 2 of 5 and Code 128 developed by Computer Identics, Code 39 (or 3 of 9) developed by Intermec Corporation, and code 93.

Some bar codes, such as UPC, are fixed length, while others are variable length. Some support only numbers, while others support alphanumeric strings (e.g., Code 39 supports full ASCII character set). Some incorporate error checking functionality.

While the bar codes listed above are generally one dimensional in that they consist of a linear string of bars, bar codes may also be two-dimensional. Two dimensional bar codes may be in a stacked form (e.g., a vertical stacking of one-dimensional codes), a matrix form, a circular form, or some other two-dimensional pattern. Some examples of 2D barcodes include code 49, code 16k, and PDF-417. All of the above bar code schemes encode a relatively small amount of information and may be converted into watermark signals using the method outlined in FIG. 1.

For more information on bar codes, see D. J. Collins, N. N. Whipple, Using Bar Code-Why It's Taking Over, (2d ed.) Data Capture Institute; R. C. Palmer, The Bar Code Book, ($3^{rd}$ ed.) Helmers Publishing, Inc., and P. L. Grieco, M. W. Gozzo, C. J. Long, Behind Bars, Bar Coding Principles and Applications, PT Publications Inc., which are hereby incorporated by reference.

Other Machine Readable Codes

Other forms of machine-readable identification include, for example, magnetic stripe, magnetic ink character recognition (MICR), optical character recognition (OCR), optical mark recognition (OMR), radio frequency identification (RF/ID) etc. The information encoded in these forms of machine-readable identification may be converted into watermark signals using the method outlined in FIG. 1.

Basic Platform Structure

Figure 10:
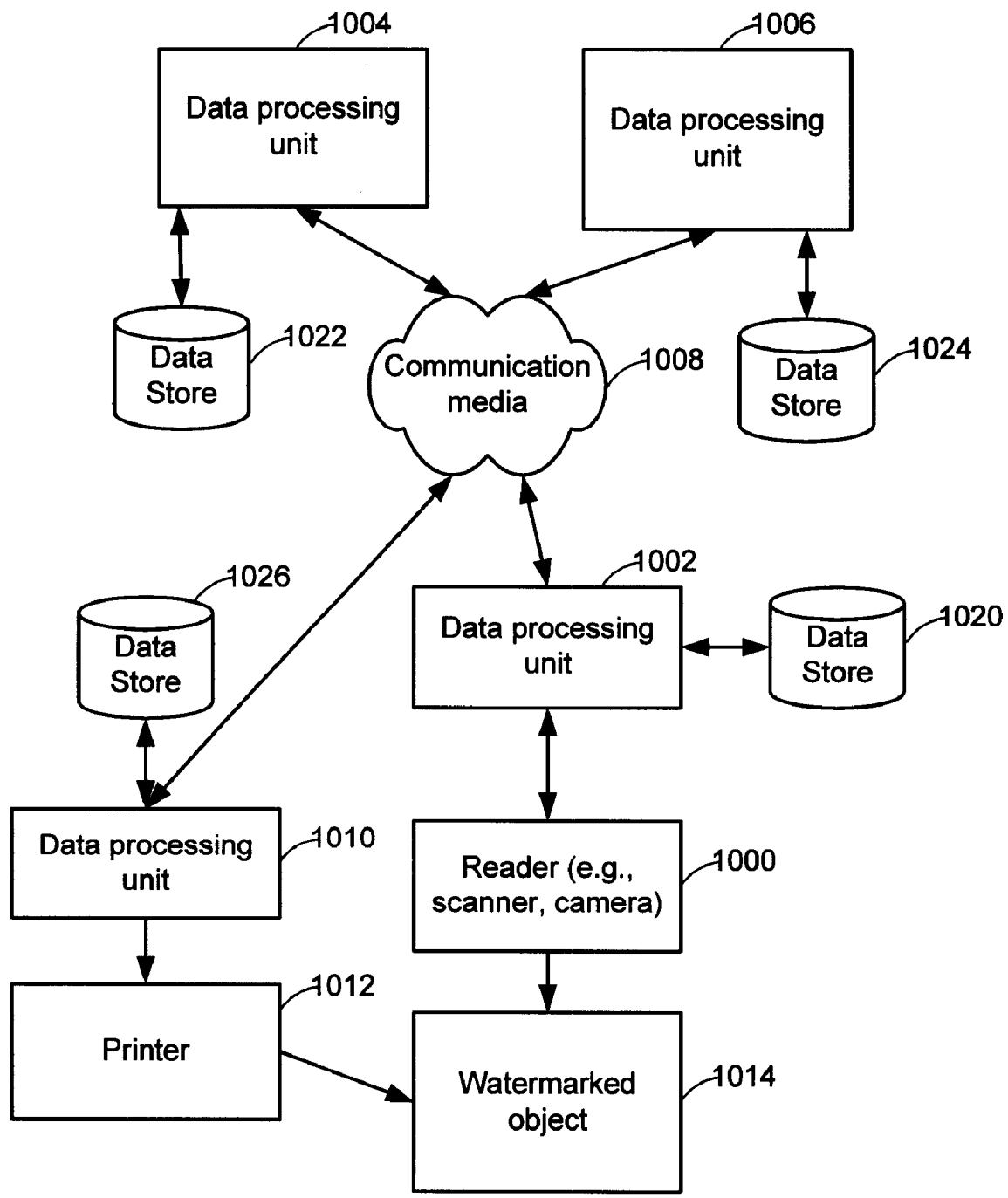
FIG. 10 is a system diagram illustrating an object messaging platform.

FIG. 10 is a block diagram illustrating an object identification and messaging platform that supports a variety of applications discussed below. The basic elements of an object messaging system include a reader device 1000 (e.g., a scanner or camera), a data processing unit 1002 connected to the reader (the reader unit), and in some applications one or more remote data processing units 1004, 1006 interconnected with the reader unit 1002 via a communication network 1008. The object messaging system includes one or more reader units, such as the reader—processing unit (1000, 1002) pair shown in FIG. 10. It may also include one or more embedder units comprising a data processing unit 1010 and printer 1012. The reader units scan and interpret the watermark signal on a watermarked object 1014 (e.g., label, tag, packaging, card, document, product, etc.). The embedder units embed the watermark signal in the object 1014. For example, the embedder prints a watermarked image on the object to create a watermarked object.

Each of the data processing units typically is associated with a data store (1020-1026). The data store is used to store a variety of data associated with a messaging application such as object messages, object references, and cross-referencing between the object messages, references and other object related data. The data store may be configured as a database using conventional database management software and data structures, such as a relational, hierarchical, or object oriented database, to name a few. In addition, the data store may be used to store the various control parameters associated with reading and embedding operations, such as encryption keys, assignment maps, detection maps, watermark carrier signals, etc. In some software applications, the data stores also store program code that implements reading and embedding functions.

The arrangement of functional units in FIG. 10 is not intended to depict a required structure of an object messaging system. The system components may be implemented using combinations of standard or custom hardware and software modules. The embedder unit may be implemented within a single device, such as an ink jet or laser printer equipped with an internal data processing unit or data store (e.g., microprocessor and memory sub-system with volatile and persistent storage devices.) Alternatively, the embedder unit may be implemented in separate components, such as a stand-alone printer connected to a computer system with a data processing unit and data store. Similarly, the reader unit may be incorporated into a single device, such as a digital camera equipped with a microprocessor and memory, or a combination of devices such as a computer and stand-alone scanner or camera.

Some applications may include sub-systems that serve as both readers and embedders with a data processing unit, data store, reader device (e.g., camera or scanner), and embedding device (e.g., printer).

The communication media interconnecting the various devices may vary as well. The communication media may be wire-based (e.g., cable, bus, discrete wiring) or wireless (radio frequency, microwave, infra-red, audio, etc.). The communication protocol governing the transfer of information (e.g., program code and data) depends on the underlying physical communication link and may encompass a variety of different standard or custom protocols.

Applications

The object message and its associated object reference embedded in a machine-readable code on an object may serve a multitude of functions. The following sections highlight some of these functions and illustrate them in the context of example applications.

Generally speaking, the function of the object reference may include any or all of: a source of information about the object, a machine instruction or set of instructions, a link or index to other information, etc.

As a source of information, the reference may identify the object through an object identifier. In addition, the reference may convey other information about the object, such as the owner, seller, buyer, manufacturer, service provider, transaction, a time or date identifier of a transaction, a location (e.g., geographic location or machine address), or monetary quantity (value, cost, price, etc.), license, terms of use, instructions for use, etc.

As a machine instruction, or set of instructions, the reference may instruct a local and/or remote data processing unit to perform some automated function, such as sending or requesting information, updating a database, launching an application program, controlling a machine action (e.g., a media recording or playback device, robot, printer, etc.). In a computer, for example, the reference may be interpreted by one computer program to execute one or more other programs. In addition, the reference may itself be a computer program that executes on the data processing unit of the reader unit or some remote data processing unit, and invokes one or more other programs.

In applications where the object is a machine, the object reference may also facilitate remote control and remote updating of control instructions for the machine. Consider examples where the object is a robot, portable or desktop computer, consumer electronic device (e.g., television, stereo component, etc.), telephone, embedded computer on board a vehicle or some other machine, appliance, etc. In such applications, the object includes an object reference, embedded in a machine-readable code. In response to scanning the object, a reader unit (such as the one depicted in FIG. 10 and described above) communicates with a server computer, either connected locally or remotely through a network (e.g., the Internet), and provides an object identifier.

The object identifier identifies the object to the server, and may also provide related information, such as its date of manufacture, its network address, a computer instruction or set of instructions, or an index to any of these types of information. The server computer returns a control instruction or set of instructions to the object via a computer communication link, such as a network connection. Alternatively, the server can instruct another computer to return these control instructions to the object. The communication link may be a wire link, wireless link or some combination of these links.

For example, the control instructions may be sent via a network to a local computer, which in turn communicates them via a wire or wireless connection to the object. The reader unit may perform the function of receiving the control instructions from the server or other computer and communicating them to the object. The reader unit may be incorporated in the object itself, or may be a separate device that scans the object periodically so that it can be updated with the latest control instructions.

One form of these control instructions is a computer program that is downloaded into a memory device such as a RAM, ROM, or disk on the object. These types of objects are equipped with a processor (e.g., DSP, microprocessor etc.) to execute the instructions from the memory device. Another form of these control instructions is machine codes that control the functions of the device through hardware that is designed to respond to a predetermined set of machine codes. Yet another form of these control instructions are operating parameters that control the operating mode of the object (such as velocity, volume, flow rate, etc.).

As a link or index, the reference may provide a mechanism for accessing more information about the object (as described in the first category) or for accessing machine instruction or set of instructions (as described in the second category). For example, in some applications, it may difficult to encode a substantial amount of information about the object in the object reference itself. The index or link addresses this problem by enabling the object reference to refer to more information about the about, which may be stored in one location or distributed in a variety of locations (e.g., a central database, or a distributed database). There may be one or more layers of indirection in the linking or indexing scheme. For example, the object reference may be a unique identification number (UID) that cross-references a Uniform Resource Locator (URL) of a web page or email address, which in turn references an Internet Protocol (IP) address.

The object reference may be much more powerful by combining two or more of the functions described above. In addition, combinations of machine-readable codes, such as watermarks and conventional machine-readable codes, may be embedded on an object. Each of the codes may perform one or more of the functions noted above. Once read, the codes may perform independent functions or perhaps more interestingly, may interact to perform any of the functions listed above.

The object reference may be coded in some established coding format, compressed, and encrypted. For example, the object reference may be coded to be compatible with some way of encoding numbers, alphabetic characters, or a language. In addition, it may be encoded according to an error correction or data compression methodology. Finally, it may be encrypted for security purposes.

The following sections discuss some object messaging applications employing watermarks or other machine-readable codes.

Reference to Resource on a Computer Network

The object reference may serve as an address of or link to a resource on a computer network, such as a local area network (LAN) or wide area network (WAN), such as the Internet. Paralleling the functional framework outlined above, the reference may encode the network address of the network resource, an index to the address in a data store, or a computer instruction or set of instructions to access the resource located at the address.

Patents relating to the use of a bar code or other machine readable code to encode an index to a network address or an address of a computer resource on an object include: U.S. Pat. Nos. 5,463,209; 5,594,226; 5,640,193; 5,939,695; 5,848,413; 5,671, 282; 5,978,773; 5,933,829; 5,918,213; 5,665,951; 5,804,803, 5,971,277; 5,940,595; 5,930,767; 5,939,699; 5,938,726; 5,903,729; 5,902,353; 5,969,324; 5,918,214; 5,950,173; 5,963,916; 5,869,819; 5,905,248; 5,905,251; 5,979,757; 5,938,727; 5,913,210; and 5,841,978. These patents are hereby incorporated by reference.

Patent Applications relating to the use of machine-readable codes to link to a network resource include: U.S. Patent Application Nos. 60/082,228, 60/141,763, 60/158,015, 09/314,648 (U.S. Pat. No. 6,681,028), 09/342,688 (U.S. Pat. No. 6,650,761), 09/342,971 (pub. no. US 2003-0040957 A1), 09/342,689 (U.S. Pat. No. 6,311,214), 09/343,104 assigned to Digimarc Corporation, which are hereby incorporated by reference.

Foreign Patent Applications relating to the use of a machine readable codes to reference a network resource include: JP application 05-262400, published as JP 7115474 on May 2, 1995; Canadian Patent Application No. 2,235,002 (Counterpart of U.S. patent application Ser. No. 08/878,359, entitled "Network-Based Search Engine Using Scanner Codes,"; WO 98/40823; WO 98/49813; WO 99/34277; PCT application US97/21975, published as WO 98/24050; Japanese application 08-326318, published on Jun. 26, 1998, as JP 10171758; Japanese application 08-335992, published on Jun. 30, 1998, as JP 10177613, entitled Method And Device For Generating And Inputting URL; GB2327565A; WO98/14887 and WO98/20642; which are hereby incorporated by reference.

Related publications include: "Distributing Uniform Resource Locators as Bar Code Images," IBM Technical Disclosure Bulletin, No. 39, No. 1, pp. 167-8, 96A 60059; "Teaching the printing of bar codes on paper to encode data represented by an icon on a computer screen," IBM Technical Disclosure Bulletin 96A 61092; and "Universal remote control for wide variety of electrical equipment e.g. TV, hi-fi, robot or car navigation unit," IBM Research Disclosure RD 410,129, which are hereby incorporated by reference.

A watermark can serve the same function as the barcode or other machine readable code in these references. In addition, a watermark can provide additional information about the object as well as machine instructions (e.g., Java applet, Visual Basic Script, etc.) to assist in automating the process of accessing the network resource. In some implementations, the watermark on an object may be used to carry a supplemental, redundant or complimentary message as the bar code.

To illustrate this application, consider the following implementation. The watermarked object containing the embedded object reference is virtually any object, including, for example, a card, piece of paper (e.g., magazine advertisement, mailer, catalog, etc.), a product, etc. Note that the object may also be in an electronic form, such as a piece of software, video, image, audio file, etc. The reader unit is a personal computer equipped with a digital camera or scanner. The computer is linked to other computers on the Internet via standard network communication and telephony equipment.

First, the reader unit captures an image of the watermarked object. For electronic objects, the digital camera and scanner are unnecessary since the reader unit can operate directly on the electronic data, skipping the step of converting it to digital form.

The watermark detector and reader processes described above are implemented in a reader program running in the computer. The reader extracts the object reference, which represents a UID. Acting first as a machine instruction, the UID signals the reader program to invoke an Internet browser such as Internet Explorer from Microsoft Corp, or Navigator from Netscape Communications Corp. In the Windows Operating System, for example, the reader can request the operating system to launch a program by invoking a run command of the operating system and naming the application. The reader passes the UID to the browser along with an instruction to access a remote server on the Internet. The browser issues a request to the server computer to interpret the UID and link the user's computer to a web site that the UID references.

A number of variations to this scenario are possible. For example, the reader can maintain its own database that cross-references the UID to a URL. This approach enables the reader to look up the URL based on the UID and then provide the URL to the browser. Alternatively, the object reference extracted from the watermark could include the URL.

To leverage existing product coding standards, the UID can encode the standard bar code information, such as the information in a UPC symbol. The reader application, or an application running on the server, can then access a database that cross references the UPC symbol with a URL to find the appropriate URL and link to the user's computer to a corresponding web site on the Internet.

In addition to providing a link to a network resource, the object reference may provide, or cause the user's computer to provide, information about the user. This enables the server to gather marketing data about the user. In addition, it allows the web site operator to personalize the web page returned to the user's computer. For example, the web page may tailor a web page about a product to emphasize aspects of it that the user is likely to be interested in.

Retail Point of Sale

As noted above, a watermark on an object can replace or supplement a barcode, such as a UPC symbol or other standard product code, in a retail point of sale application. In this application, the object reference embedded in the watermark on the product packaging labeling, packaging or tag provides a product identifier. The reader unit at the checkout counter extracts the product identifier from the watermark and uses it to look up the product and its price.

If the watermark is encoded on plural surfaces of an object (e.g., all around a box or can), the cashier need not manipulate the object to expose a certain surface to a scanner, as is typically required in the prior art. A reduction in repetitive motion injuries (e.g., RSI) may result.

In the framework depicted in FIG. 10, the reader unit corresponds to a cash register terminal connected to a digital camera or scanner. The cash register terminal is a computer system with a microprocessor and memory system. It preferably executes a multitasking operating system to support watermark reader, database management and network communication software.

The watermark reader software is preferably integrated with a cash register system that tabulates the total sale, handles various methods of payment (e.g., cash, check, credit card, store credit), and adds tax where applicable. The cash register is equipped with a display monitor that displays various prompts, including information about the product in response to scanning its watermark. The cash register is programmed to perform a variety of other functions, such as tracking layaways and custom order deposits, performing credit checks and alerting cashiers of bad credit history, handle refinds and exchanges, communicate with other computer systems via a network, etc.

In some implementations, the reader unit can also recognize the protocol by which currency may some day be watermarked. In such case, the associated terminal can compute the change due (e.g., from a twenty dollar bill) to the customer, reducing cashier and customer error (e.g., a customer tendering a ten dollar bill, thinking it is a twenty).

Database management software may be used to perform inventory control as items are purchased, returned or reserved. For each of these transactions, in store personnel use a camera or scanner to read the product identifier from the watermarked product. The reader software extracts the product identifier and communicates the identifier along with input identifying the type of the transaction to database management software, which in turn, updates a database that tracks store inventory.

In a similar fashion, watermark labels on shelves may also be used to track the types and number of products on shelves. In the storeroom, watermarks on shipping containers help track when new products have arrived and have been added to the inventory.

In addition to the point of sale functions, the watermark may be used to provide product support after the sale. For example, a watermark on the product or embedded in an object associated with the product, such as an invoice or warranty card can enable the product owner to link to a database to access product or service support information. In one scenario, for instance, the buyer registers the product by using the watermark to link to the seller's computer and provide information about the buyer. Subsequent to the sale, the buyer uses the link to access a database with the product's user instructions and repair information. The seller may enable the user to submit feedback via the link to an interactive web site. Through this link, the seller maintains a history of product, including a repair history. The seller can post product updates and promotions at the interactive web site as well.

Watermark embedding functions may be incorporated into point of sale applications as well. It is useful to encode information about the transaction in a tangible record such as an invoice, receipt, or label affixed to the product. This information can be encoded in a watermark image and printed directly on the transaction record. To simplify the watermark signal, for example, the embedder can encode a transaction identifier that serves as an index to a transaction database entry, which stores information about the transaction. Such information facilitates processing of returns and exchanges. It also allows the vendor to keep a history of a product after the transaction. For instance, if the product needs to be repaired, then the vendor can automatically update a product history database by scanning the transaction record. If the user wants repair information or instructions, the watermark can act as a portal to the vendor's web site as described above.

Watermark messaging provides a number of advantages for retail applications. The watermark may be replicated throughout a substantial portion of the packaging or labeling. If invisible watermarks are employed, the watermark does not detract from the aesthetics of the packaging. Also, it facilitates scanning by store personnel because the user does not have to search for the code or physically position the product or reader in an uncomfortable position.

Object Counting and Tracking

A variety of object counting and tracking applications can be implemented using watermark object identifiers on objects to be counted and tracked. Some example applications include file tracking, specimen tracking, asset tracking, time and attendance tracking, work in process (WIP) tracking, and warranty repair tracking, to name a few. In these applications, the object reference includes an identifier. The reader unit extracts the identifier and records application specific data, such as the time, the number of objects, the location, the weight/volume of the object, monetary data (e.g., object value, cost or price). The reader unit typically operates in conjunction with other software, such as database management software, that gathers data from the reader and other input devices and stores them in data records associated with the objects being tracked. This software may be implemented within the reader unit, or a remote device, as shown in the configuration of FIG. 10.

Inventory Control

Watermark identifiers on products or their containers can be used to track product inventory. In these applications, the inventory items are marked with an object reference that includes an object identifier. The reader unit operates in conjunction with inventory management software that increments and decrements a database of items as they flow in and out of inventory. Inventory items may be marked by printing a watermark on a label, which is affixed to the item, or by directly applying the watermark to the object surface.

Production Control

Watermark identifiers on objects, including labels, packaging and containers, can be used in production control. For example, the watermark may encode information about the object such as an identifier, a machine instruction or set of instruction, or an index to information or instructions. The reader units are positioned at various points in a production or manufacturing process. As the objects move through production, the reader units read the object reference from the watermark and communicate the information to a local or remote control (see the configuration of FIG. 10 for example). The control device responds by performing manufacturing operations triggered based on the object reference.

Postal Applications

Watermark codes can be used to track and sort many forms of mail. Watermarks provide an advantage relative to some other machine-readable codes in that they can be replicated throughout the object surface and can be scanned from a variety of orientations. Envelopes are particularly suitable for watermarking by texturing.

Operating Environment for Computer Implementations

Figure 11:
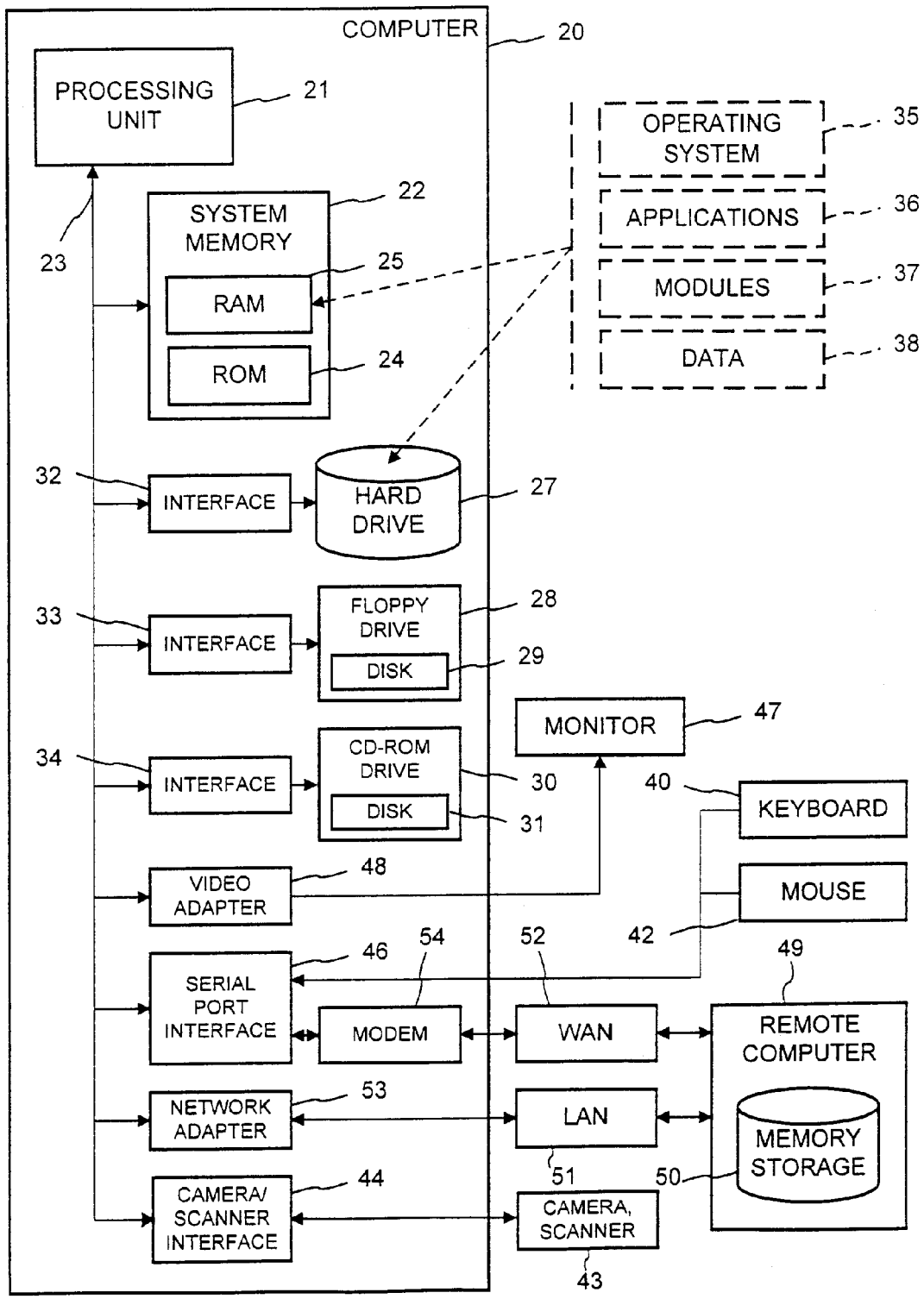
FIG. 11 is a diagram illustrating a computer system that serves as an operating environment for software implementations of watermark embedding and reading systems and object messaging applications.
Figure 8:
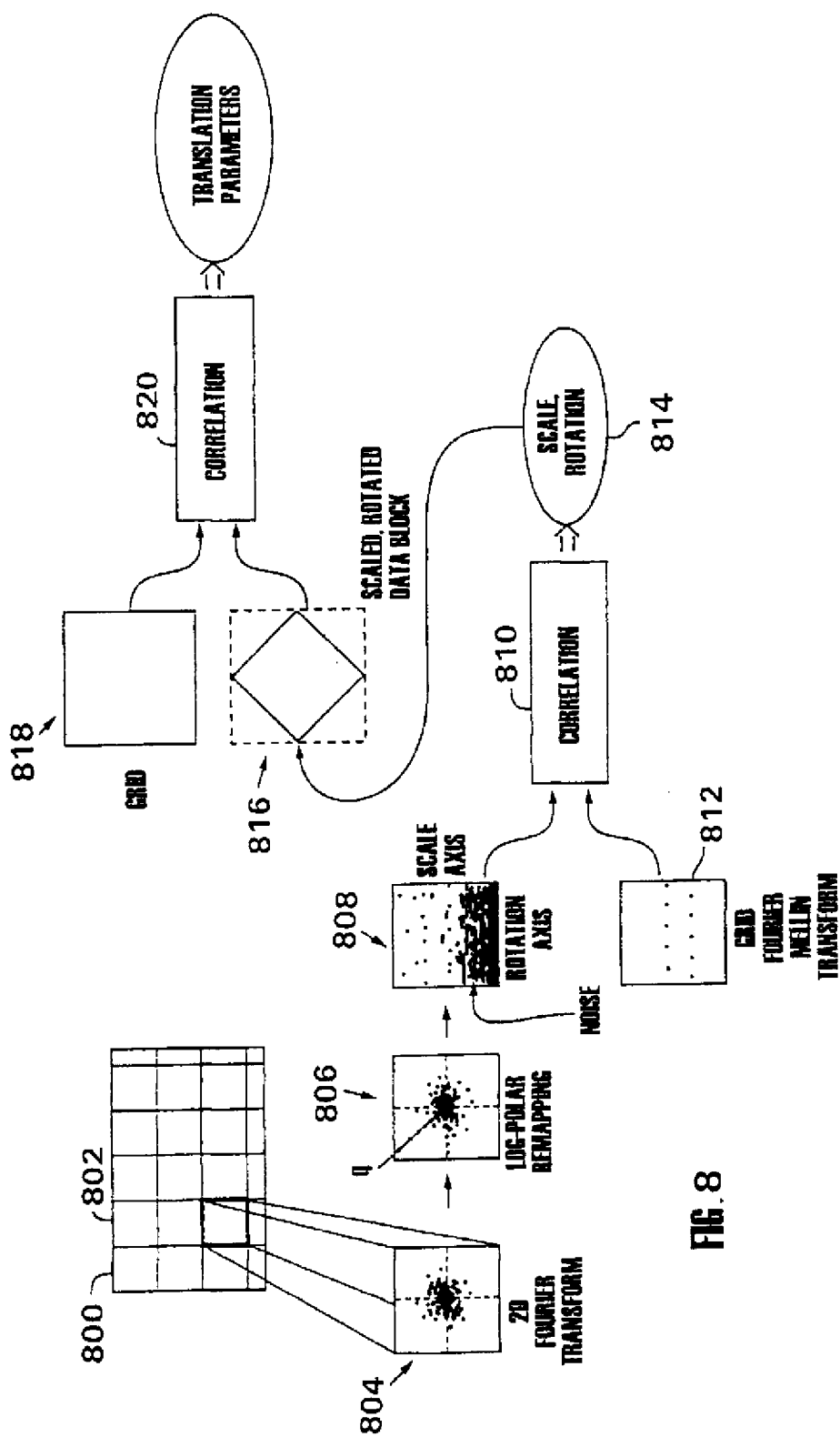
Figure 11:
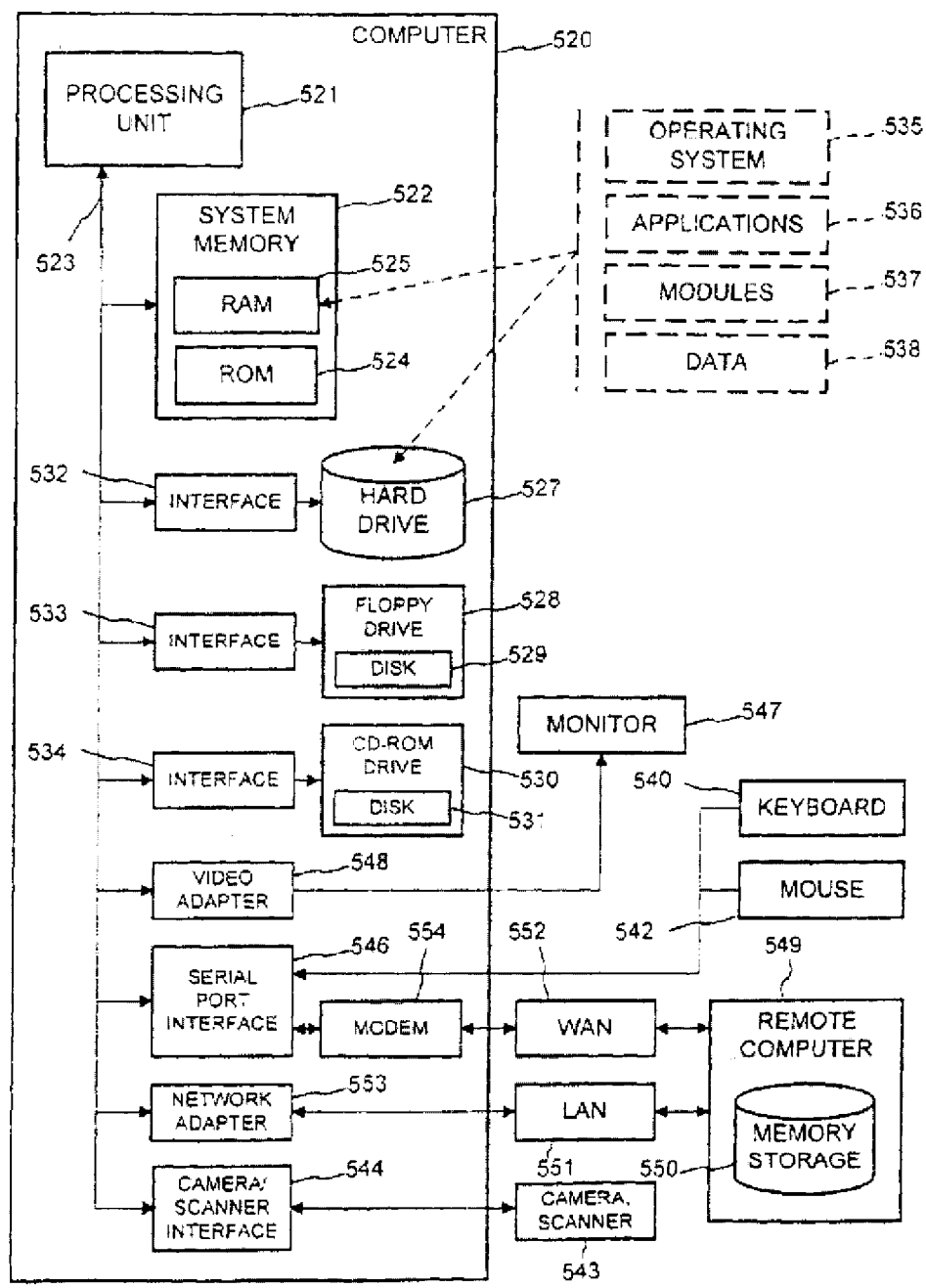

FIG. 11 illustrates an example of a computer system that serves as an operating environment for object messaging and watermarking applications implemented in a computer and computer network. The computer system includes a computer 520, including a processing unit 521, a system memory 522, and a system bus 523 that interconnects various system components including the system memory to the processing unit 521.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 524 and random access memory (RAM) 525. A basic input/output system 526 (BIOS), containing the basic routines that help to transfer information between elements within the computer 520, such as during start-up, is stored in ROM 524.

The computer 520 further includes a hard disk drive 527, a magnetic disk drive 528, e.g., to read from or write to a removable disk 529, and an optical disk drive 530, e.g., for reading a CD-ROM disk 531 or to read from or write to other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage of data, data structures, computer-executable instructions (program code such as dynamic link libraries, and executable files), etc. for the computer 520.

Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 525, including an operating system 535, one or more application programs 536, other program modules 537, and program data 538.

A user may enter commands and information into the personal computer 520 through a keyboard 540 and pointing device, such as a mouse 542. Other input devices may include a microphone, joystick, game pad, satellite dish, digital camera, scanner, or the like. A digital camera or scanner 43 may be used to capture the target image for the detection process described above. The camera and scanner are each connected to the computer via a standard interface 44. Currently, there are digital cameras designed to interface with a Universal Serial Bus (USB), Peripheral Component Interconnect (PCI), and parallel port interface. Two emerging standard peripheral interfaces for cameras include USB2 and 1394 (also known as firewire and iLink).

These and other input devices are often connected to the processing unit 521 through a serial port interface 546 that is coupled to the system bus, but may be connected by other interfaces, such as a parallel port, game port or a universal serial bus (USB).

A monitor 547 or other type of display device is also connected to the system bus 523 via an interface, such as a video adapter 548. In addition to the monitor, personal computers typically include other peripheral output devices (not shown), such as speakers and printers.

The computer 520 operates in a networked environment using logical connections to one or more remote computers, such as a remote computer 549. The remote computer 549 may be a server, a router, a peer device or other common network node, and typically includes many or all of the elements described relative to the computer 520, although only a memory storage device 550 has been illustrated in FIG. 5. The logical connections depicted in FIG. 5 include a local area network (LAN) 551 and a wide area network (WAN) 552. Such networking environments are commonplace in offices, enterprise-wide computer networks, intranets and the Internet.

When used in a LAN networking environment, the computer 520 is connected to the local network 551 through a network interface or adapter 553. When used in a WAN networking environment, the personal computer 520 typically includes a modem 54 or other means for establishing communications over the wide area network 552, such as the Internet. The modem 554, which may be internal or external, is connected to the system bus 523 via the serial port interface 546.

In a networked environment, program modules depicted relative to the personal computer 520, or portions of them, may be stored in the remote memory storage device. It will be appreciated that the network connections shown are exemplary and that other means of establishing a communications link between the computers may be used.

Concluding Remarks

Having described and illustrated the principles of the invention with reference to specific implementations, it will be recognized that the principles thereof can be implemented in many other, different, forms. To provide a comprehensive disclosure without unduly lengthening the specification, applicants incorporate by reference the patents and patent applications referenced above.

The particular combinations of elements and features in the above-detailed embodiments are exemplary only; the interchanging and substitution of these teachings with other teachings in this and the incorporated-by-reference patents/applications are also contemplated.

What is claimed is:

1. A method comprising:
    receiving audio or video content, wherein the audio or video content comprises a hidden steganographic code including information, the steganographic code being hidden in the audio or video content through alterations to data representing the audio or video content;
    detecting the steganographic code to obtain the information, said act of detecting utilizes correlation to obtain the information;
    providing at least a portion of the information to a data repository to identify machine-executable instructions stored therein;
    providing data associated with a user to the data repository;
    receiving machine-executable instructions from the data repository; and
    executing the machine-executable instructions to control processing of the audio or video content.

2. The method of claim 1 wherein executing the machine-executable instructions processes the audio or video content as part of inventory or distribution management.

3. The method of claim 1 wherein executing the machine-executable instructions processes the audio or video content as part of audio or video identification.

4. The method of claim 1 wherein executing the machine-executable instructions processes the audio or video content as part of a purchase of the audio or video content.

5. The method of claim 1 further comprising receiving information or instructions from the data repository in response to the data associated with the user.

6. A computing apparatus programmed to perform the method of claim 1.

7. An apparatus comprising:
    means for receiving audio or video content, wherein the audio or video content comprises a hidden steganographic code including information, the steganographic code being hidden in the audio or video content through alterations to data representing the audio or video content;
    means for detecting the steganographic code to obtain the information, said detecting utilizes correlation to detect and obtain the information;
    means for providing at least a portion of the information to a data repository to identify machine-executable instructions stored therein;
    means for providing data associated with a user to the data repository;
    means for receiving machine-executable instructions from the data repository; and
    means for executing the machine-executable instructions to control processing of the audio or video content.

8. The apparatus of claim 7 in which said means for executing the machine-executable instructions processes the audio or video content as part of inventory or distribution management.

9. The apparatus of claim 7 in which said means for executing the machine-executable instructions processes the audio or video content as part of audio or video identification.

10. The apparatus of claim 7 in which said means for executing the machine-executable instructions processes the audio or video content as part of a purchase of the audio or video content.

11. The apparatus of claim 7 further comprising means for receiving information or instructions from the data repository in response to the data associated with the user.

\* \* \* \* \*

UNITED STATES PATENT AND TRADEMARK OFFICE
CERTIFICATE OF CORRECTION

| | |
|---|---|
| PATENT NO. | : 8,379,908 B2 |
| APPLICATION NO. | : 11/383684 |
| DATED | : February 19, 2013 |
| INVENTOR(S) | : Davis et al. |

It is certified that error appears in the above-identified patent and that said Letters Patent is hereby corrected as shown below:

On the Title Page, in Item (63), under "Related U.S. Application Data", in Column 1, Line 4, delete "Pat. No. 6,324,573" and insert -- Pat. No. 6,324,573, which is a continuation of application No. 08/508,083, filed on July 27, 1995, now Pat. No. 5,841,978 and said application No. 9/451,021 filed on November 30, 1999, --, therefor.

On Title Page 3, in Item (56), under "OTHER PUBLICATIONS", in Column 2, Line 1, delete "O'Runanaidh," and insert -- O'Ruanaidh, --, therefor.

In the Drawings

Delete Drawing Sheet 5 of 8, and substitute therefor with the attached Drawing Sheet 5 of 8.

In Fig. 11, Sheet 8 of 8, replace the Figure with the enclosed Replacement Sheet.

In the Specification

In Column 2, Line 65, delete "emdedder" and insert -- embedder --, therefor.

In Column 8, Line 59, delete "probablistic" and insert -- probabilistic --, therefor.

In Column 8, Line 65, delete "process. the" and insert -- process. The --, therefor.

In Column 16, Line 62, delete "refinds" and insert -- refunds --, therefor.

Signed and Sealed this
Thirtieth Day of September, 2014

Michelle K. Lee
*Deputy Director of the United States Patent and Trademark Office*